United States Patent
Firth et al.

(10) Patent No.: US 11,445,698 B2
(45) Date of Patent: Sep. 20, 2022

(54) LIVESTOCK CHUTE WITH BOTH PARALLEL AND V-SQUEEZE CAPABILITY, A PULL-UP NECK EXTENDER AND A ROBUST HEAD GATE TRACK

(71) Applicant: Northquip Inc., Woodlands (CA)

(72) Inventors: Philip Malcolm Firth, Woodlands (CA); Stephen Arthur Langrell, Woodlands (CA)

(73) Assignee: Northquip Inc., Woodlands (CA)

( * ) Notice: Subject to any disclaimer, the term of this patent is extended or adjusted under 35 U.S.C. 154(b) by 0 days.

(21) Appl. No.: 17/581,449

(22) Filed: Jan. 21, 2022

(65) Prior Publication Data

US 2022/0248633 A1   Aug. 11, 2022

Related U.S. Application Data

(63) Continuation of application No. PCT/CA2021/051101, filed on Aug. 9, 2021.

(60) Provisional application No. 63/113,326, filed on Nov. 13, 2020.

(51) Int. Cl.
*A01K 1/00*   (2006.01)
*A01K 1/06*   (2006.01)

(52) U.S. Cl.
CPC .................. *A01K 1/0613* (2013.01)

(58) Field of Classification Search
USPC ................................. 119/751, 752
See application file for complete search history.

(56) References Cited

U.S. PATENT DOCUMENTS

| 2,593,559 A | 4/1952 | Heldenbrand |
| 2,678,631 A * | 5/1954 | Hagar ................. A01K 1/0613 |
| | | 119/737 |
| 3,099,249 A | 7/1963 | Newhouse, Jr. |
| | (Continued) | |

FOREIGN PATENT DOCUMENTS

| CA | 2998006 | 3/2018 |
| CN | 209790078 U | 12/2019 |

OTHER PUBLICATIONS

Thompson Longhorn. Est 1983, Sumo Pneumatic with ICT, circa 2018.

*Primary Examiner* — Richard T Price, Jr.
(74) *Attorney, Agent, or Firm* — Kyle R Satterthwaite; Ryan W Dupuis; Ade & Company Inc.

(57) ABSTRACT

A livestock squeeze chute is operable in parallel-squeeze, V-squeeze and inverted-V squeeze configurations, and has a head gate with a novel guide track construction for robust rolling support of the gate panels, and a neck extender having uniquely positioned actuators that pull the neck extender upwardly into its working position. The squeeze panels are supported in suspended and hinged fashion from a set of movable supports that are displaceable laterally back and forth along a set of overhead support tracks. A pair of upper actuators are operable to move the hinged-equipped supports, and thereby relocate the tops of the squeeze panels, while a set of lower actuators are operable to relocate the bottom ends of the squeeze panels. The head gate's guide track uses two L-shaped bars and a cooperating U-channel to define a pair of enclosed channels in which roller carriages of the two gate panels are respectively received.

16 Claims, 15 Drawing Sheets

(56) References Cited

U.S. PATENT DOCUMENTS

| | | | | |
|---|---|---|---|---|
| 3,229,666 A | * | 1/1966 | Sedevie | A01K 1/0017 |
| | | | | 119/734 |
| 3,237,603 A | | 3/1966 | Markegard | |
| 3,814,060 A | | 6/1974 | Swenson | |
| 3,960,113 A | * | 6/1976 | Kratky | A01K 1/0613 |
| | | | | 119/723 |
| 4,048,961 A | * | 9/1977 | Priefert | A01K 1/0613 |
| | | | | 119/752 |
| 5,111,773 A | | 5/1992 | Akins | |
| 5,129,362 A | * | 7/1992 | Ferrell | A61D 3/00 |
| | | | | 119/843 |
| 5,184,572 A | * | 2/1993 | Meier | A01K 15/00 |
| | | | | 119/733 |
| 5,331,923 A | * | 7/1994 | Mollhagen | A61D 3/00 |
| | | | | 119/734 |
| 5,626,100 A | * | 5/1997 | Stubbs | A61D 3/00 |
| | | | | 119/734 |
| 5,669,332 A | * | 9/1997 | Riley | A61D 3/00 |
| | | | | 119/751 |
| 6,425,351 B1 | * | 7/2002 | Mollhagen | A01K 1/0613 |
| | | | | 119/733 |
| 6,502,531 B1 | * | 1/2003 | Pound | A61D 3/00 |
| | | | | 119/757 |
| 6,513,459 B2 | * | 2/2003 | Linn | A01K 1/0613 |
| | | | | 119/729 |
| 6,609,480 B2 | | 8/2003 | Daniels et al. | |
| 2004/0168652 A1 | | 9/2004 | Priefert | |
| 2008/0308047 A1 | | 12/2008 | Mollhagen | |
| 2015/0013618 A1 | * | 1/2015 | Mollhagen | A01K 1/0613 |
| | | | | 119/752 |
| 2017/0360000 A1 | | 12/2017 | Gipson | |

* cited by examiner

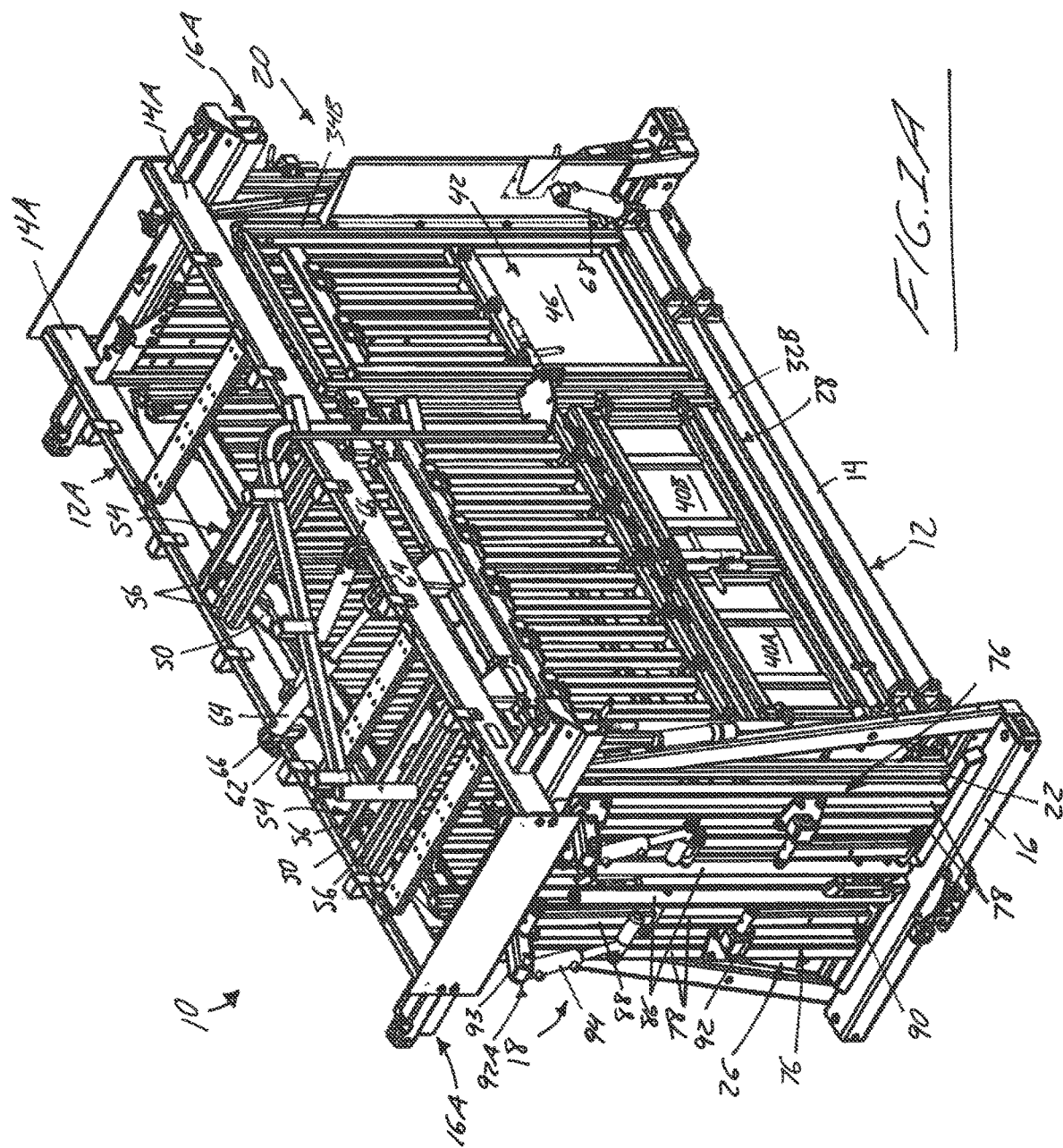

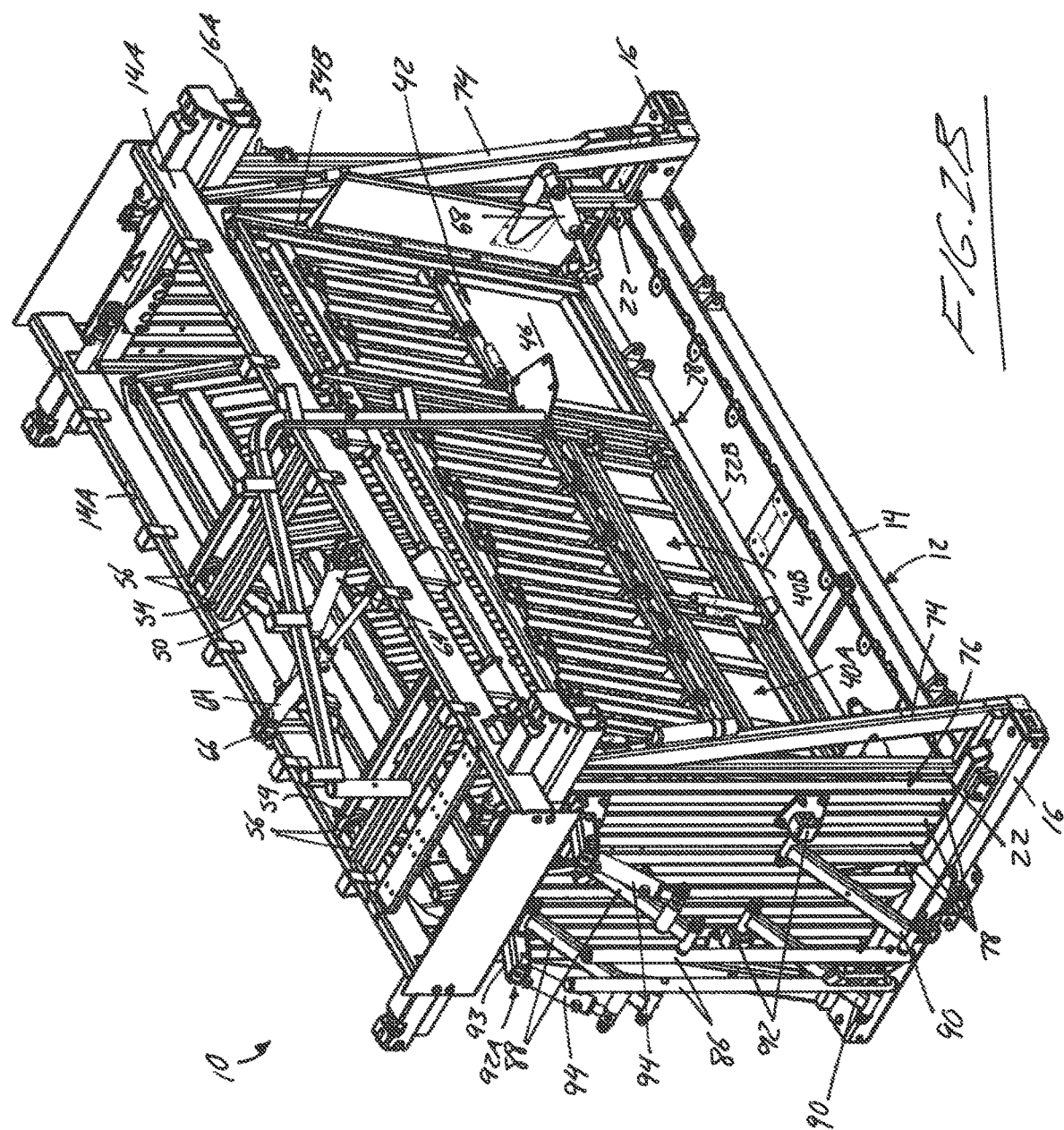

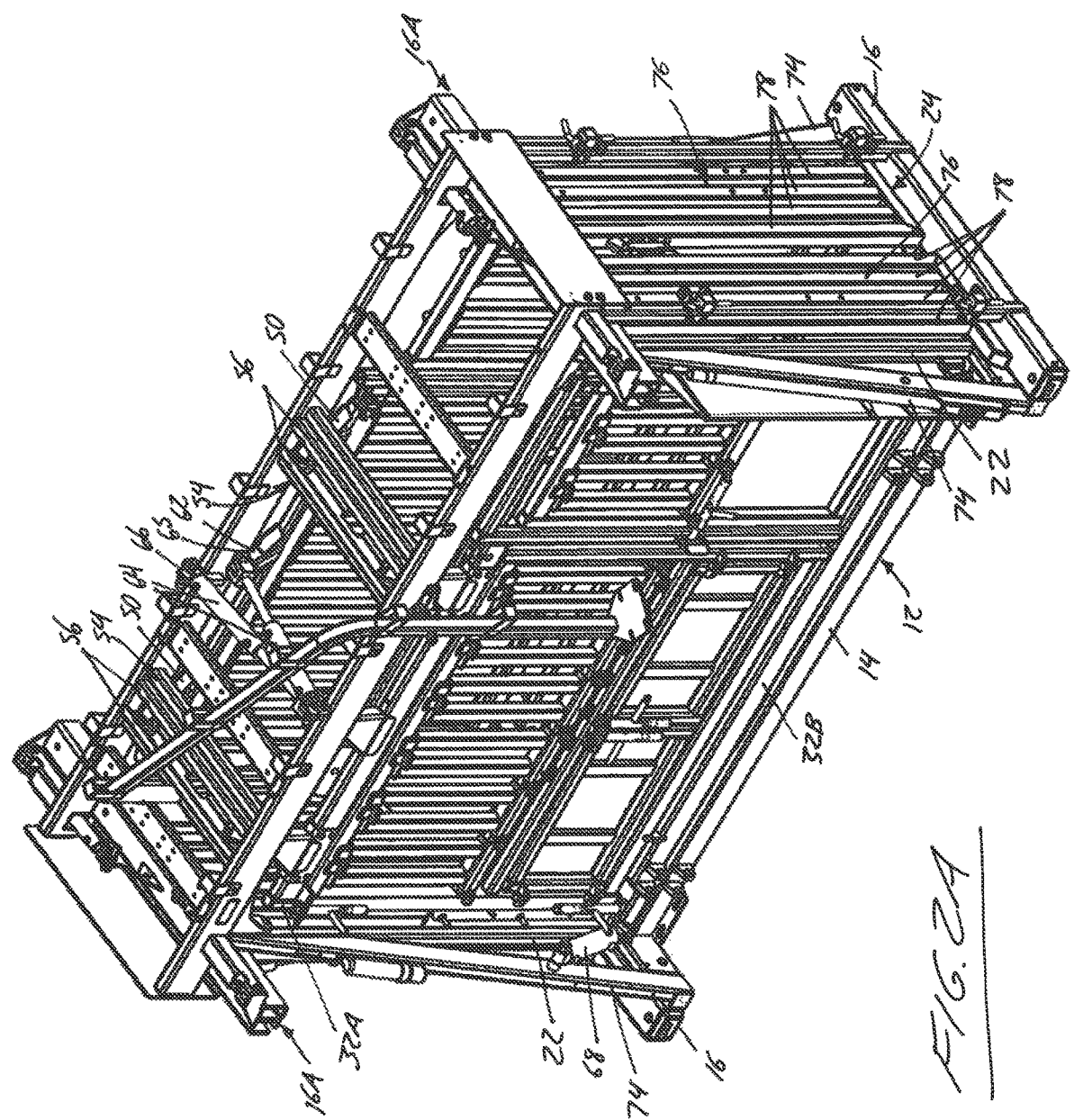

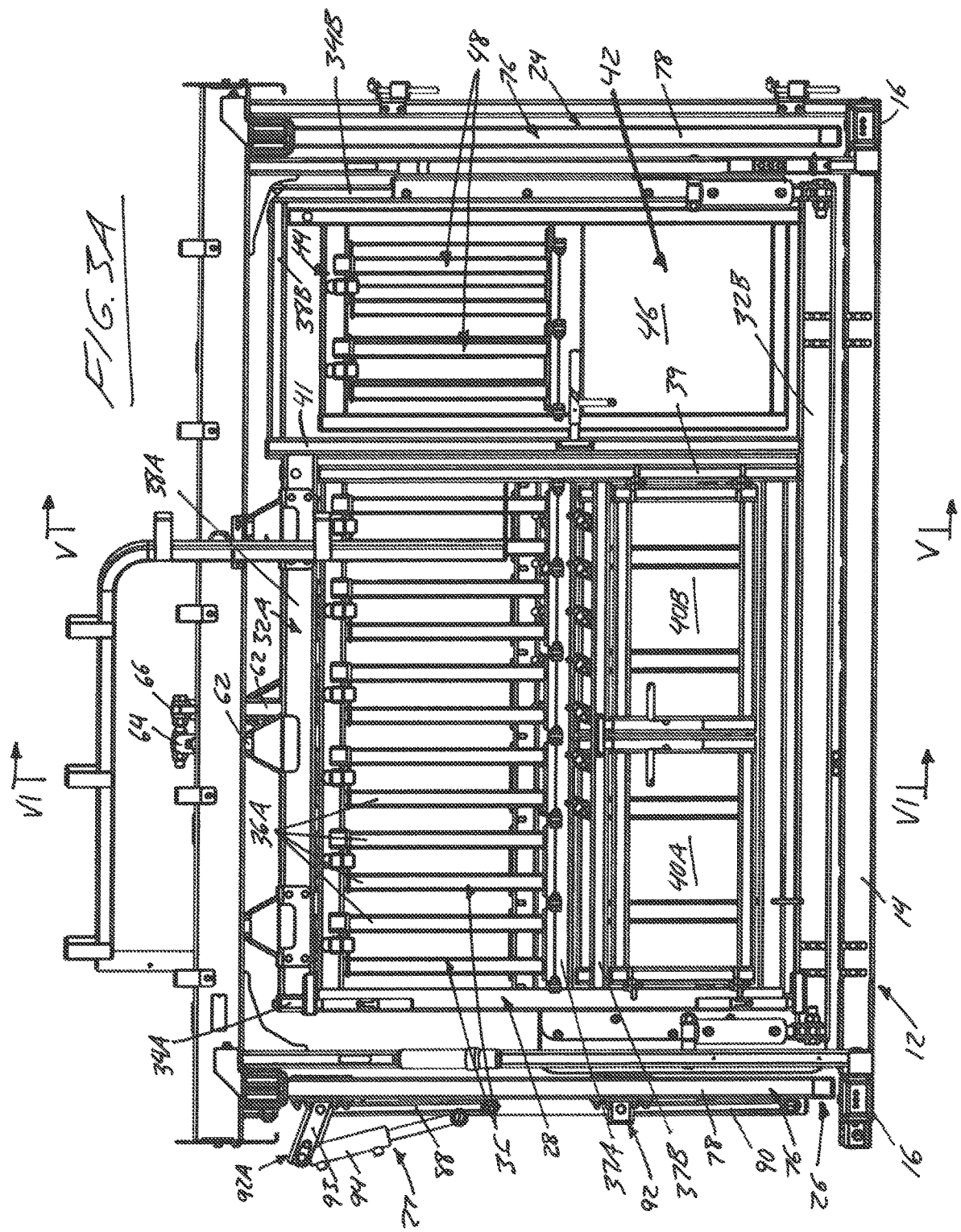

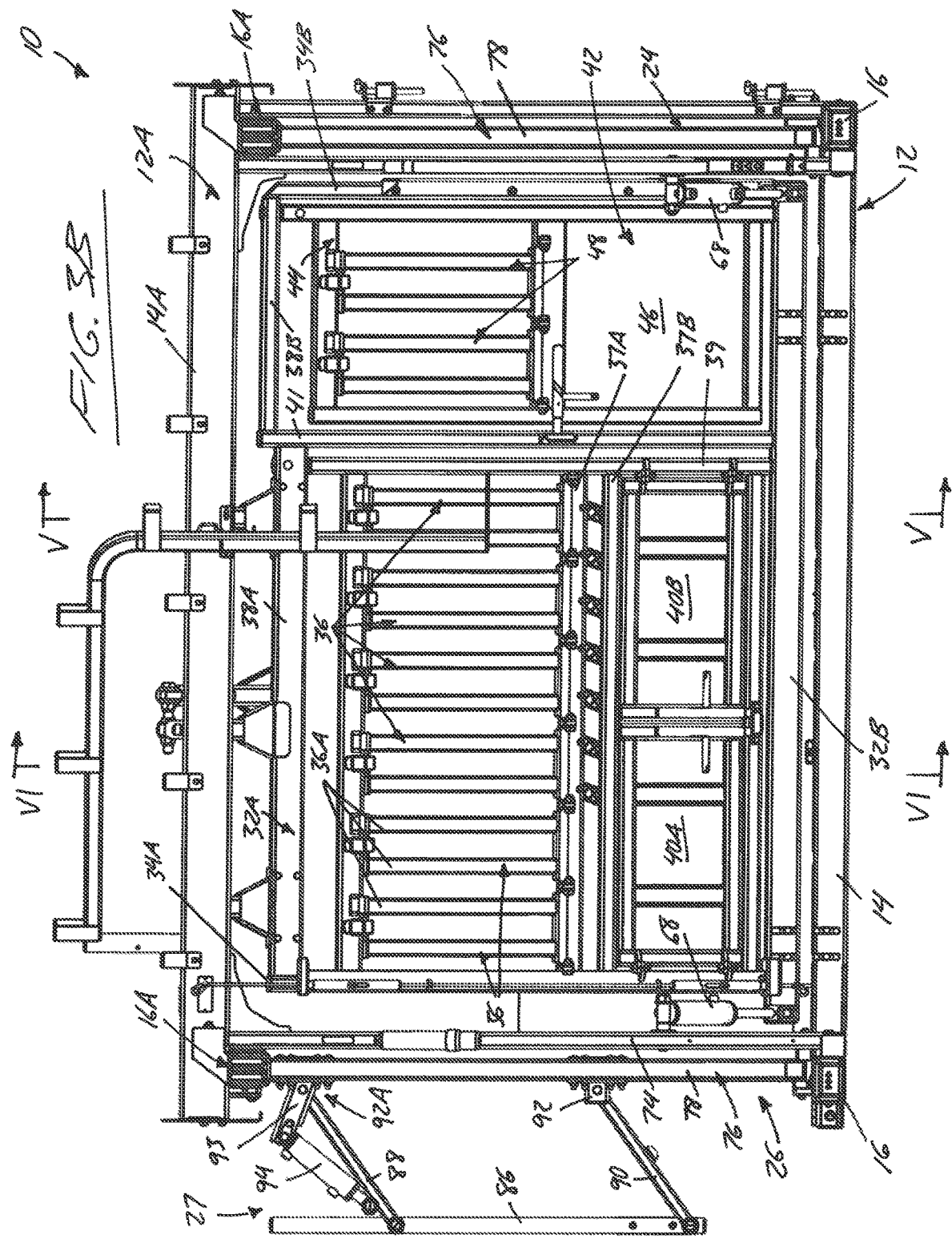

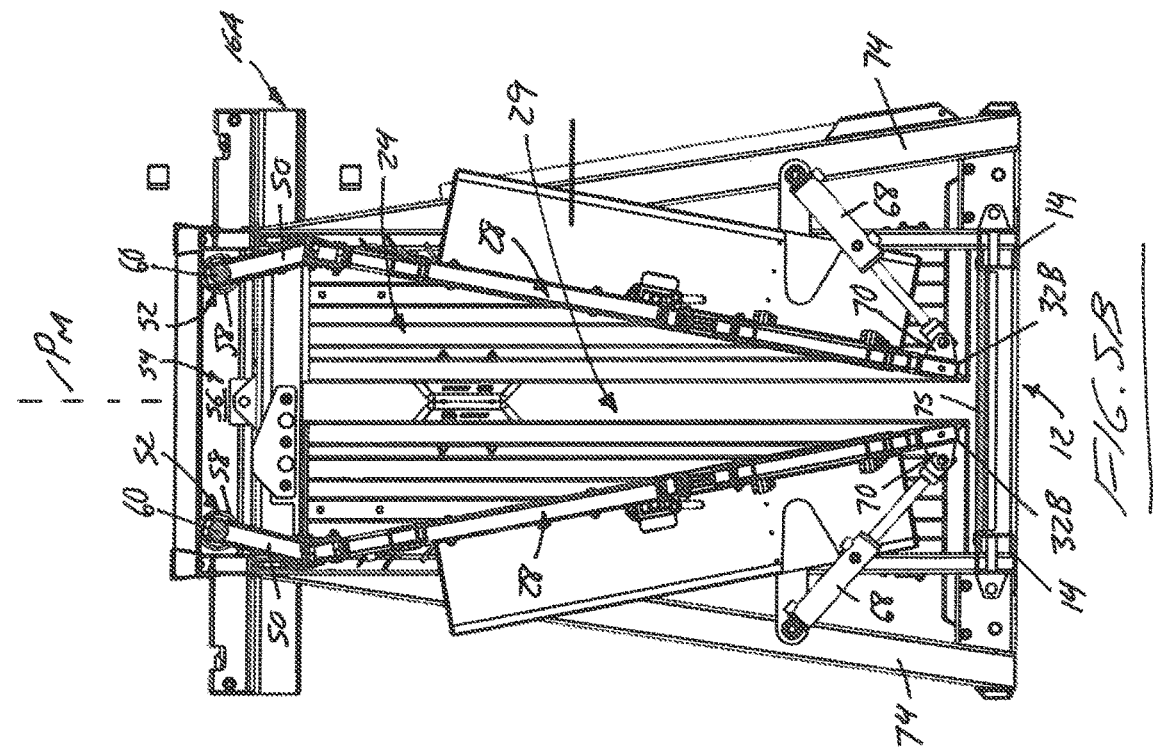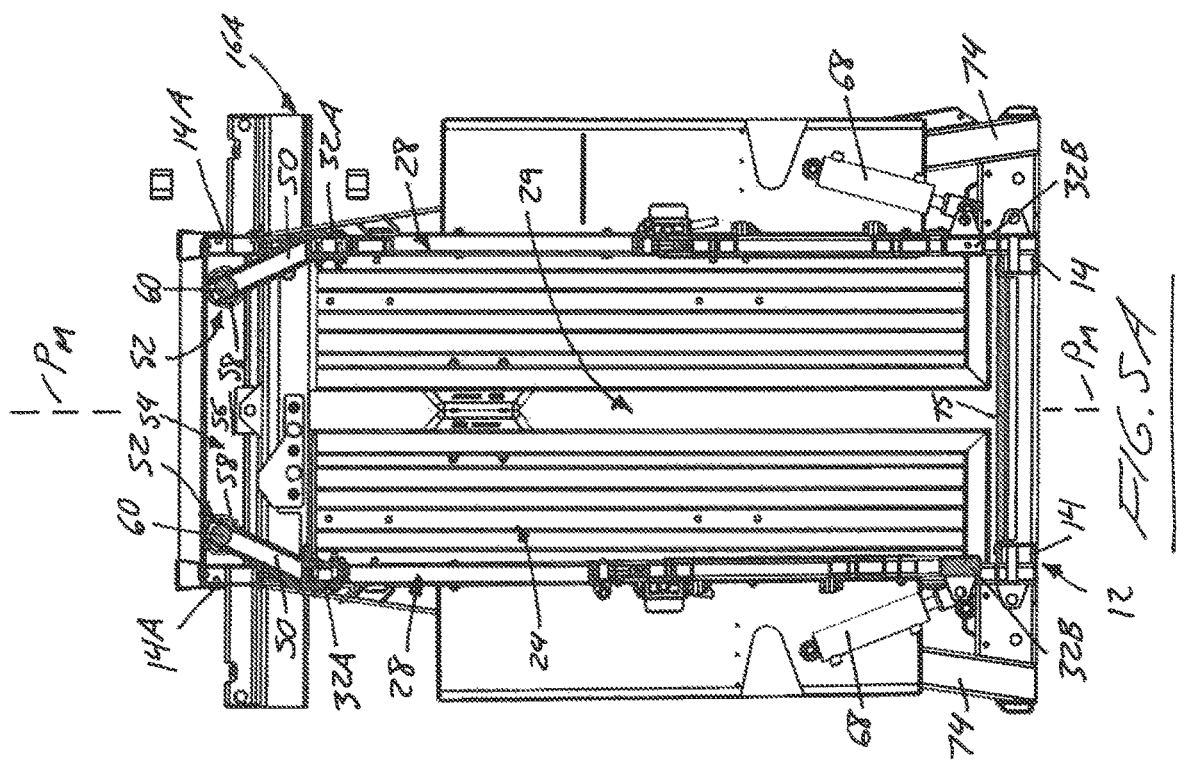

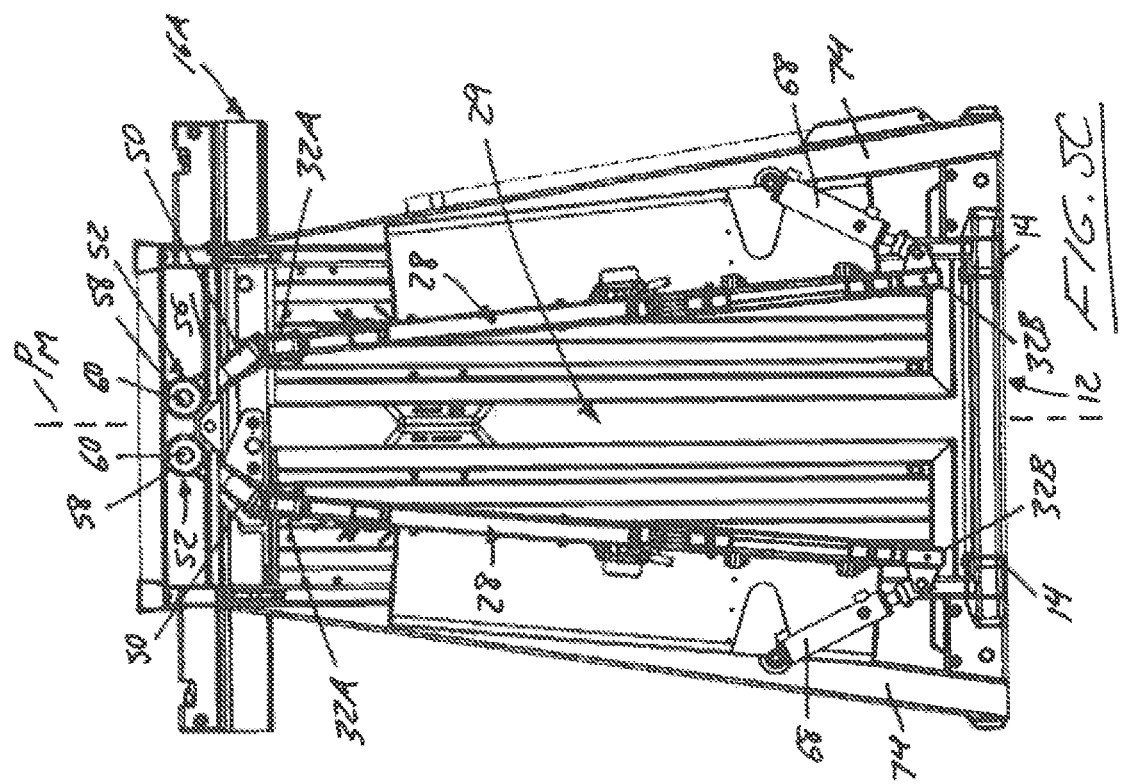

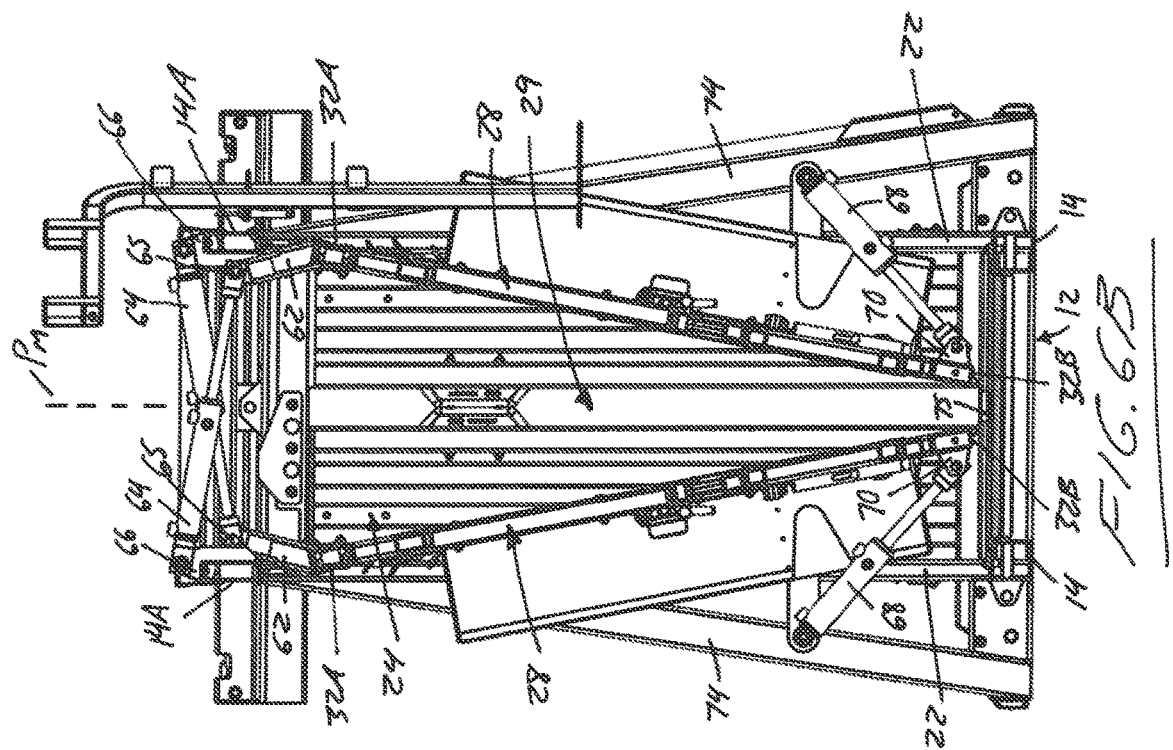
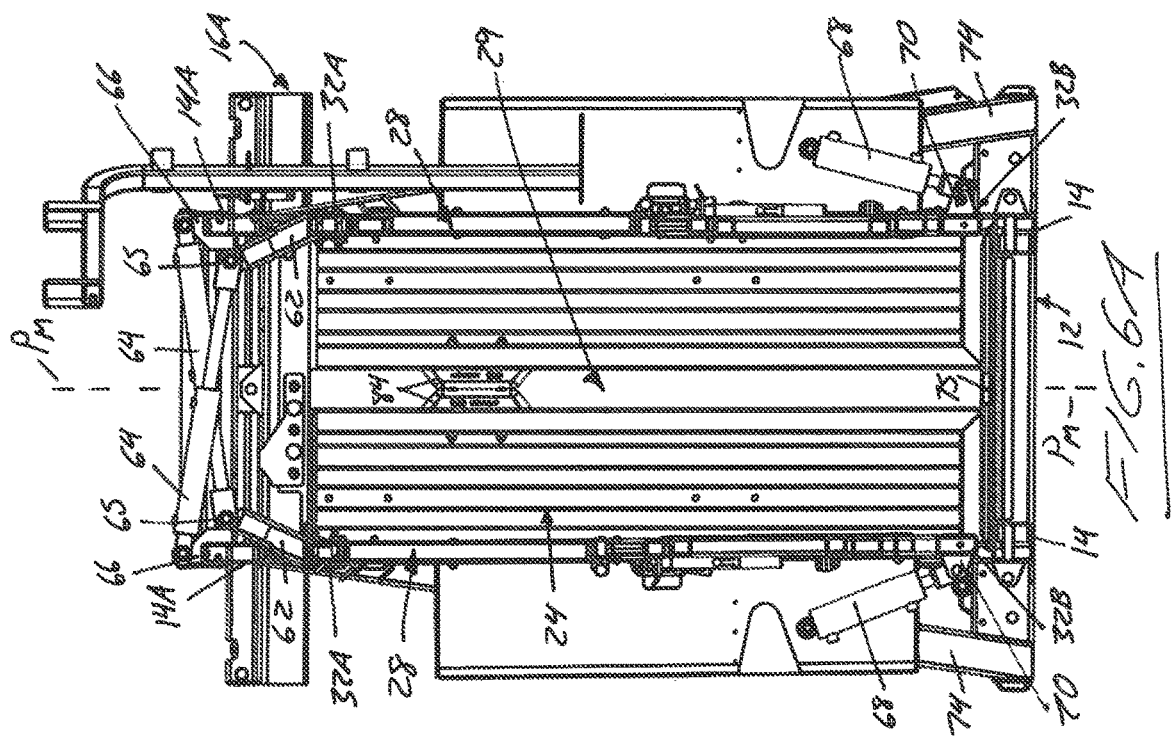

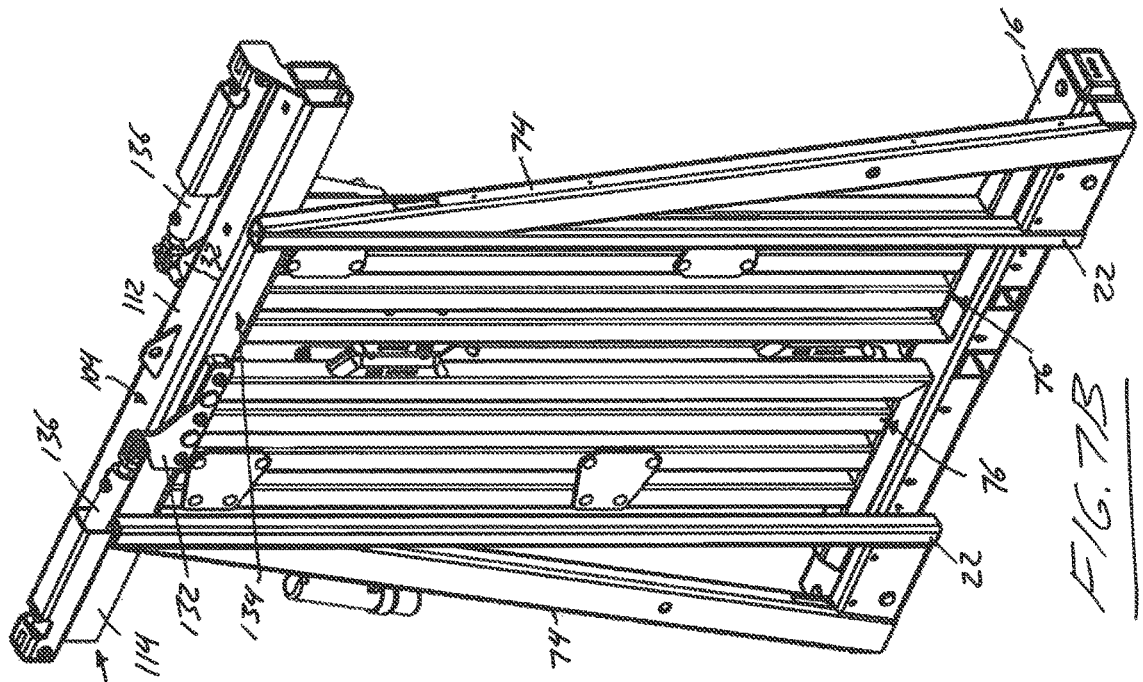
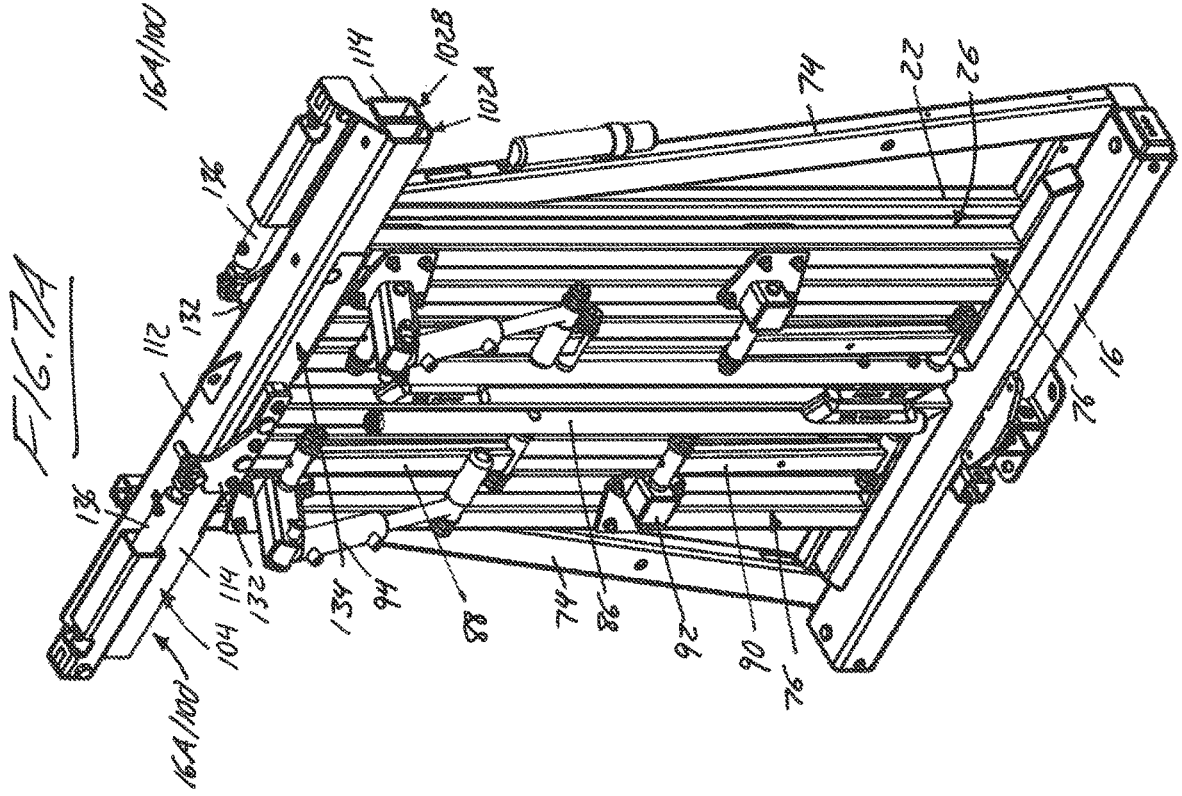

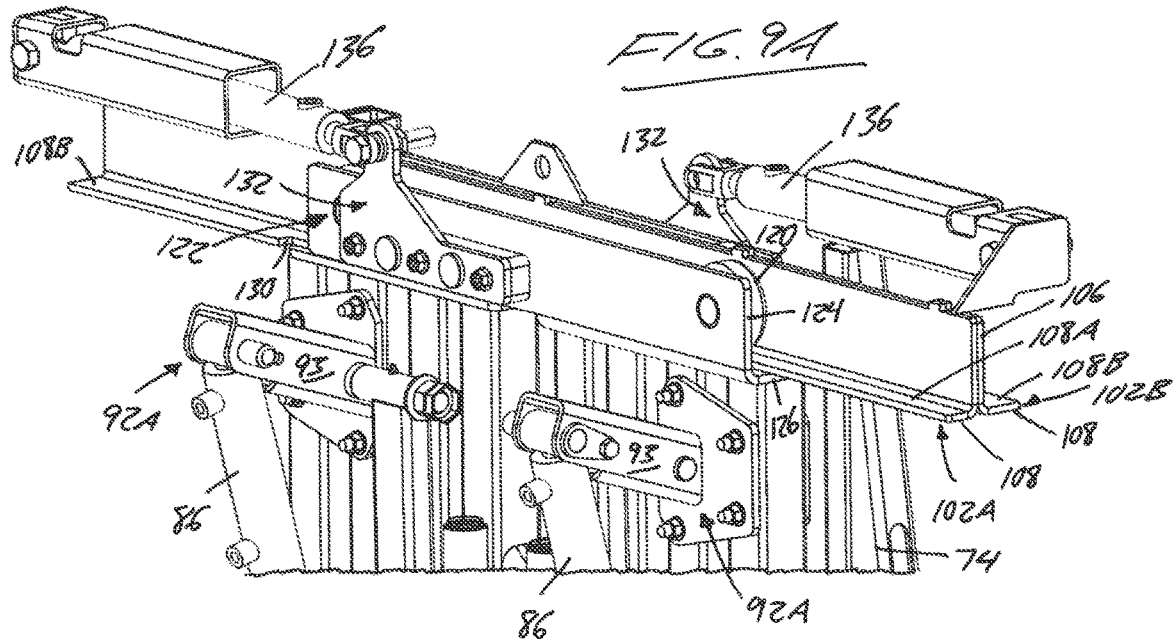
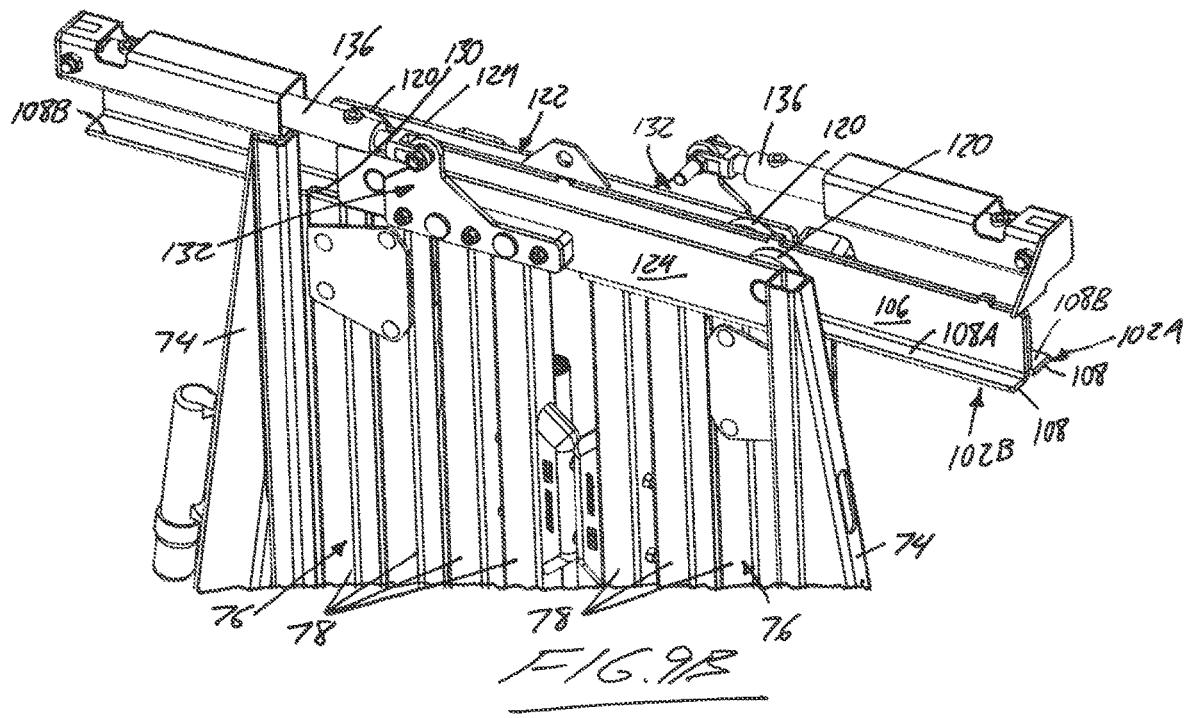

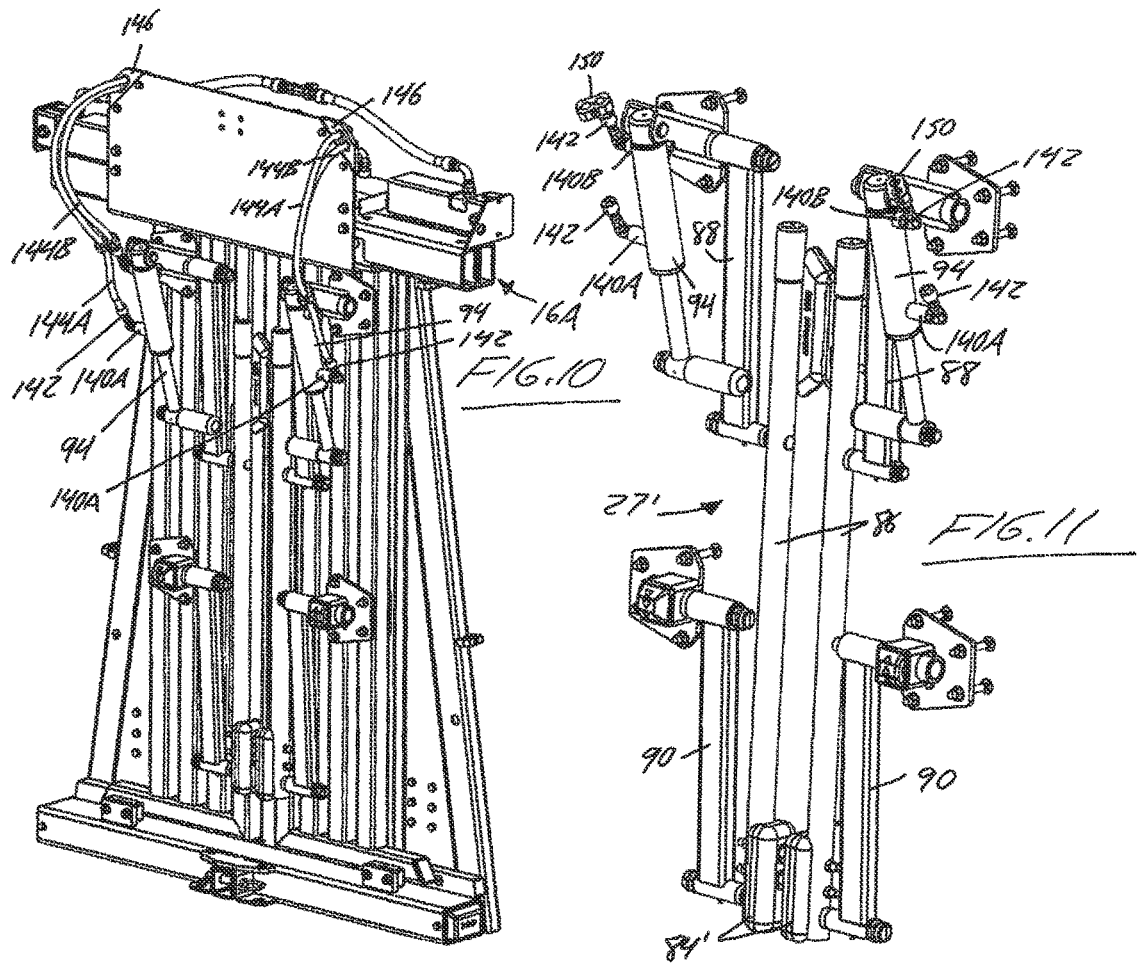
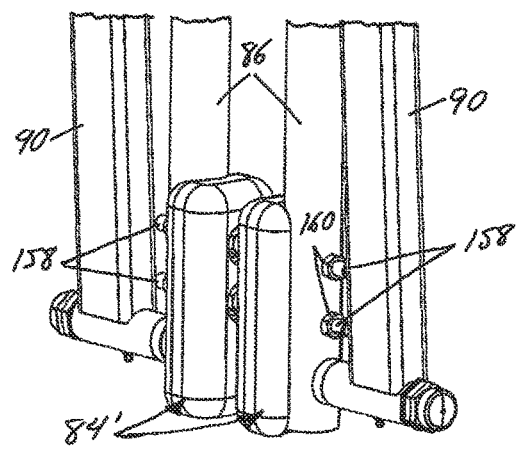
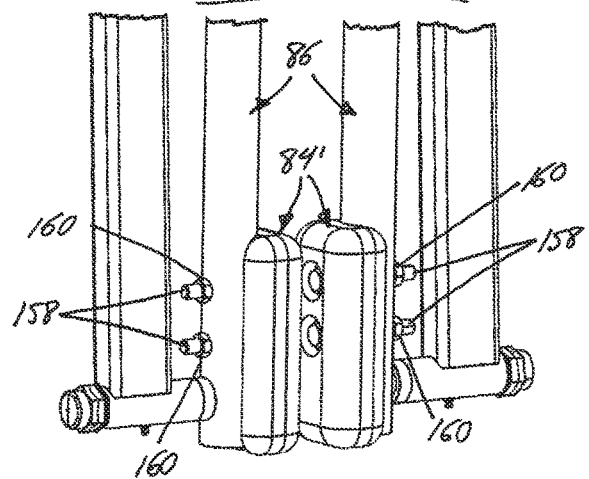

LIVESTOCK CHUTE WITH BOTH PARALLEL AND V-SQUEEZE CAPABILITY, A PULL-UP NECK EXTENDER AND A ROBUST HEAD GATE TRACK

CROSS-REFERENCE TO RELATED APPLICATIONS

This application is a continuation of International PCT Application No. PCT/CA2021/051101, filed Aug. 9, 2021, the entirety of which is incorporated herein by reference.

FIELD OF THE INVENTION

The present invention relates generally to livestock handling equipment, and more particularly to livestock chutes with squeeze panels, head gates and neck extenders.

BACKGROUND

Livestock squeeze chutes are conventionally available in one of two possible predetermined configurations, either a parallel-squeeze configuration or a V-squeeze configuration. In a parallel-squeeze setup, two squeeze panels at opposing sides of the chute reside in parallel planes of vertically upright orientation, and are linearly displaced toward and away from one another to constrict and widen a rectangular squeeze space that is delimited between them. In a V-squeeze setup, the two squeeze panels are not parallel to one another, and instead lie in respective inclined planes of upwardly divergent relation to one another. Each panel is pivotably supported at its bottom end, and adjustment of the squeeze space width is performed by angular tilting of the panels about their pivotally supported bottom ends to change how close together or far apart the movable top ends of the panels are from one another. In a parallel-squeeze setup, the squeeze space is a rectangular parallelopiped that is of uniform width throughout its full height. In a V-squeeze setup, the squeeze space is not of uniform width, and instead is an inverted trapezoidal prism of downwardly tapering width, i.e. a space of greater width at its top end than at its bottom. By tilting the top ends of the V-squeeze panels toward and away from one another, the width of the squeeze space, at elevations above the pivotally supported bottom ends of the panels, is varied.

Conventionally, one must pick and choose a suitable squeeze chute from among product offerings in the parallel-squeeze category or the V-squeeze category. It would be desirable to provide a more flexible product offering by which an owner or operator doesn't have to specifically pick or choose from two different single-function product categories beforehand, and instead has the ability to experiment with, or flip back and forth between, parallel-squeeze and V-squeeze configurations without needing to acquire chutes from both product categories.

Another known issue in the field of livestock handling is the need for heavy duty designs can withstand the significant demands made of handling equipment, for example particularly in the context of feedlot applications where hundreds of head of cattle can be routed through such equipment on a daily basis. One particular concern is the need for robust head gate construction. It is known that livestock running quickly through a chute may sometimes crash against a closed head gate with significant impact force, which particularly with use of thinner gauged steel, can be of detriment to the structural integrity and reliable operability of the head gate.

Another aspect of Applicant's endeavours is intelligent use of animal science as a key guiding principle in their equipment design strategy, making best use of animal psychology to understand what will help motivate livestock to travel safely and quickly through handling equipment of various types based on the animal's natural instinct. To this end, Applicant has been employing strategic placement of light-admitting componentry within their handling equipment to take advantage of cattle's natural instinct to move toward visible light when they find themselves in an enclosed space. Among Applicant's product designs making use of this principle, are head gates whose gate panels are of uncladded skeletal construction, resulting in open spaces therein through which light can enter a livestock chute, whereby this visible light visually encourages animals onwardly through the chute toward the head gate installed at the chute exit.

In connection with such endeavours, it would be desirable to provide neck extenders or other head gate accessories that have been specially redesigned for optimal compatibility and synergy with such light-admitting head gate designs, as opposed to prior designs that, even if installed on Applicant's uncladded skeletal gate panels, would be of relatively obstructive relationship to the purposeful open spaces thereof through which the desired light admissibility is achieved.

Disclosed herein is a livestock chute including several novel aspects, including solutions to addressing the forgoing concerns in the art.

SUMMARY OF THE INVENTION

According to a first aspect of the invention, there is provided livestock squeeze chute comprising:

a frame having an entrance at one end an exit at an opposing end spaced therefrom in a longitudinal direction;

first and second squeeze panels movably supported on the frame between the entrance and the exit in positions residing opposite one another in a lateral direction that lies transverse to said longitudinal direction;

said first and second squeeze panels being reconfigurable between:

a parallel-squeeze configuration in which said first and second squeeze panels reside substantially parallel to one another in substantially vertical planes running in the longitudinal direction, thereby delimiting a rectangular squeeze space between said first and second squeeze panels that, throughout a height of said rectangular squeeze space, has a substantially uniform width measured between said first and second squeeze panels said transverse direction; and a V-squeeze configuration in which said first and second squeeze panels reside in non-parallel upwardly divergent relation to one another in respective inclined planes of laterally tilted relation to said vertical planes, thereby delimiting a tapered squeeze space between said first and second squeeze panels that has a downwardly tapered width measured between said first and second squeeze panels said transverse direction;

wherein said first and second squeeze panels are configured for selective movement relative to one another, in each of said parallel-squeeze and V-squeeze configurations, both in a squeezing manner moving toward one another in said lateral direction to constrict said rectangular or tapered squeeze space, and in a retracting manner moving away from one another in said lateral direction to widen said rectangular or tapered squeeze space.

According to a second aspect of the invention, there is provided a livestock head gate for use at an exit of a livestock chute, said livestock gate comprising;

a pair of gate panels movable between an open condition allowing a livestock animal to traverse through said livestock gate, and a closed condition bracing against opposing sides of said livestock animal to hold said livestock animal generally stationary within between said gate panels; and a neck extender operably installed on said gate panels for the purpose of urging a head of the livestock animal forwardly and upwardly when said livestock animal is braced and held by said gate panels;

wherein said neck extender comprises:

a pair of neck bars supported in generally upright orientations at front sides of the gate panels at positions disposed respectively adjacent opposing sides of a central opening between said gate panels;

for each neck bar, a respective pair of upper and lower support links movably supporting the neck bar on a respective one of the gate panels, each of said support links having a pivotal connection to the respective gate panel at proximal end of the support link and a pivotal connection to the neck bar at an opposing distal end of the support link, of which the pivotal connection to the respective gate panel defines a horizontal pivot axis lying transversely of the head gate, about which the support link is pivotable between a stowed position hanging closely adjacent the front side of the respective gate panel, and a deployed position angling forwardly outward from the front side of the respective gate panel; and for each neck bar, a respective actuator having an upper end pivotally coupled to the respective gate panel, and a lower end pivotally coupled to the upper support link of said neck bar at a distance from the proximal end of said upper support link, whereby collapse of the actuator is operable to pull the distal end of the upper support link upwardly and outwardly from the respective gate panel from the stowed position into the deployed position, and extension of the actuator is operable to push the distal end of the upper support link downwardly back toward the respective gate panel and into the stowed position.

According to a third aspect of the invention, there is provided a livestock head gate for use at an exit of a livestock chute, said livestock gate comprising;

a pair of gate panels movable between an open condition allowing a livestock animal to traverse through said livestock gate, and a closed condition bracing against opposing sides of said livestock animal to hold said livestock animal generally stationary within between said gate panels; and a neck extender operably installed on said gate panels for the purpose of urging a head of the livestock animal forwardly and upwardly when said livestock animal is braced and held by said gate panels;

wherein said neck extender comprises:

a pair of neck bars supported in generally upright orientations at front sides of the gate panels at positions disposed respectively adjacent opposing sides of a central opening between said gate panels;

for each neck bar, at least one respective support link movably supporting the neck bar on a respective one of the gate panels, said support link having a pivotal connection to the respective gate panel at or near a proximal end of the support link and a pivotal connection to the neck bar at or near an opposing distal end of the support link, of which the pivotal connection to the respective gate panel defines a horizontal pivot axis lying transversely of the head gate, about which the support link is pivotable; and for each neck bar, a respective actuator pivotably coupled between the respective support link and the respective gate panel to effect pivotal movement of said respective link;

wherein the gate panels comprise uncladded skeletal structures each having a set of skeletal bars and a set of opening therebetween through which light is admissible through the head gate and into the livestock chute to entice animals toward the exit, and the actuators are positioned in alignment with respective skeletal bars of the gate panels so as to have zero or minimal obstruction of the openings between said skeletal bars of the gate panels.

According to a fourth aspect of the invention, there is provided a livestock gate comprising:

two gate panels equipped with respective roller carriages at upper ends thereof; and an overhead guide track traversing across an animal-accommodating opening of the gate and with which the respective roller carriages are rollingly engaged for rolling movement of said two gate panels toward one another into a closed position bracing a livestock animal between said gate panels and away from one another into an open position releasing said livestock animal from between said gate panels;

said overhead guide track comprising:

first and second L-shaped bars each having an L-shaped cross-section composed of an upright leg and a lateral leg jutting outward from a lower end of said upright leg, said first and second L-shaped bars having their respective upright legs placed back-to-back with one another to form a divider wall of the track, from which the lateral legs of the first and second L-shaped bars jut outwardly in opposing directions to define two respective rail surfaces of the track that reside on opposing sides of said divider wall; and a track cover having a U-shaped cross-section composed of a central web with two flanges jutting therefrom in a same direction at opposing ends of said central web, said track cover residing overtop of said first and second L-shaped bars in a downwardly-opening orientation in which the central web of the track cover spans across a top end of the divider wall, and the flanges of the track cover hang downwardly from the central web on the opposing sides the divider wall in respective positions each residing across a respective one of the rail surfaces from said divider wall;

wherein the roller carriages of the gate panels comprise rollers riding atop the rail surfaces of the two L-shaped bars within interior spaces of two enclosed channels that are cooperatively formed by the two L-shaped bars and the track cover, of which the interior space of each channel is horizontally bound between the upright leg of a respective one of the L-shaped bars and a respective one of the track cover's two flanges.

BRIEF DESCRIPTION OF THE DRAWINGS

One preferred embodiment of the invention will now be described in conjunction with the accompanying drawings in which:

FIGS. 1A and 1B are front perspective views of a squeeze chute of the present invention, of which FIG. 1A shows the chute in a parallel-squeeze mode with a neck extender thereof in a stowed non-working position, and FIG. 1B shows the chute in a V-squeeze mode with the neck extender in a deployed working position.

FIGS. 2A and 2B are rear perspective views of the squeeze chute of FIGS. 1A and 1B, respectively.

FIGS. 3A and 3B are side elevational views of the squeeze chute of FIGS. 1A and 1B, respectively.

FIGS. 5A and 5B are cross-sectional views of the squeeze chute of FIGS. 3A and 3B, respectively, as viewed along cross-sectional lines V-V thereof.

FIG. 5C is a cross-sectional view similar to FIGS. 5A and 5C, but with the chute in an inverted-V squeeze mode.

FIGS. 6A and 6B are cross-sectional views of the squeeze chute of FIGS. 3A and 3B, respectively, as viewed along cross-sectional lines VI-VI thereof.

FIGS. 7A and 7B are front and rear perspective views, respectively, of a head gate of the squeeze chute, shown in isolation from a remainder of the chute.

FIGS. 9A and 9B are front and rear perspective views, respectively, of the head gate of FIG. 8B.

FIG. 10 is a front perspective view of a variant of the head gate of FIG. 7, which features a modified version of the neck extender mounted thereon.

FIG. 11 is a front perspective view of the modified neck extender of FIG. 10, shown in isolation from the head gate.

FIGS. 12A and 12B partial front and rear perspective views of the modified neck extender, with closeup emphasis on novel lower bumpers thereof.

DETAILED DESCRIPTION

Figure 2B:
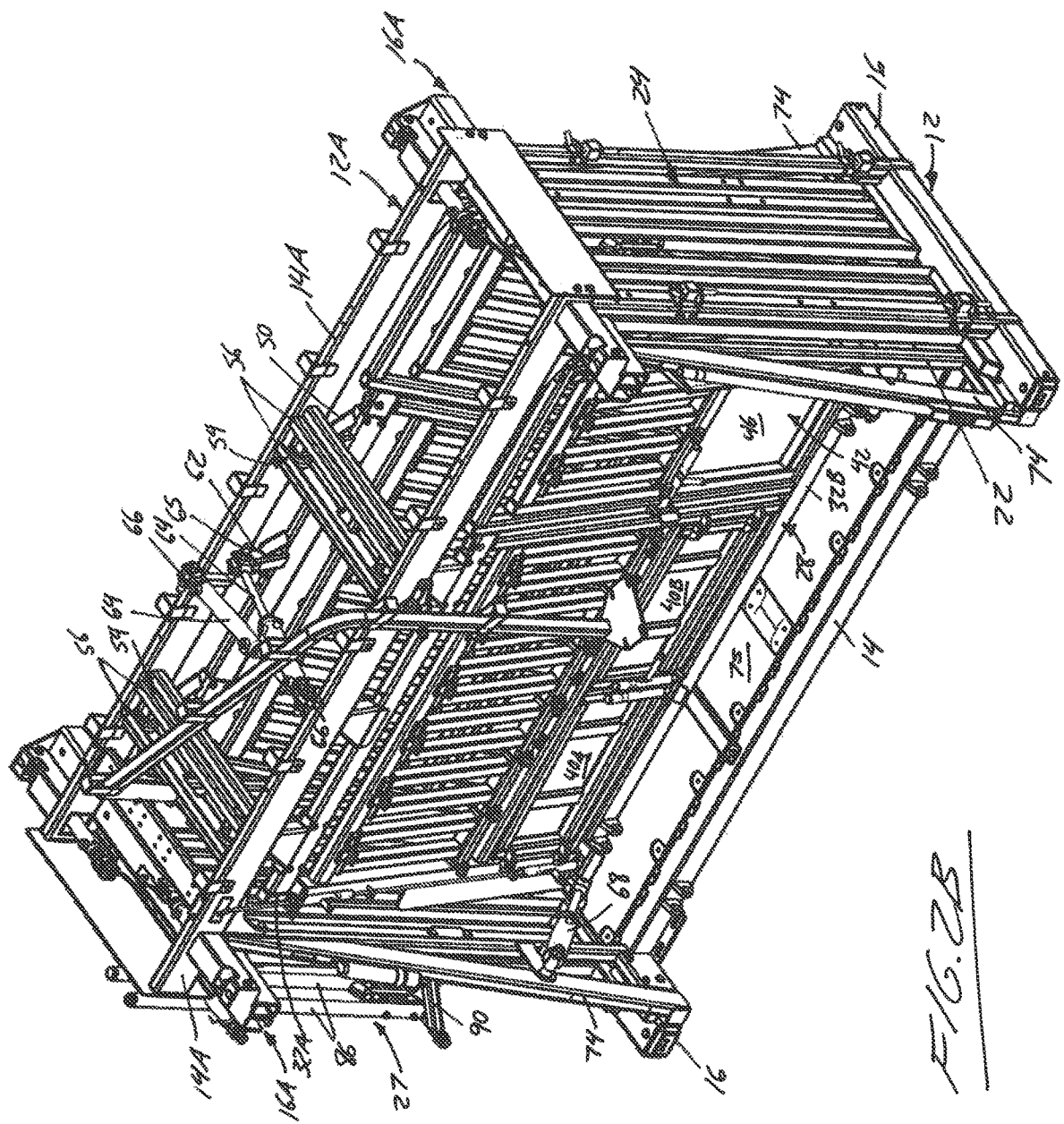
Figure 4A:
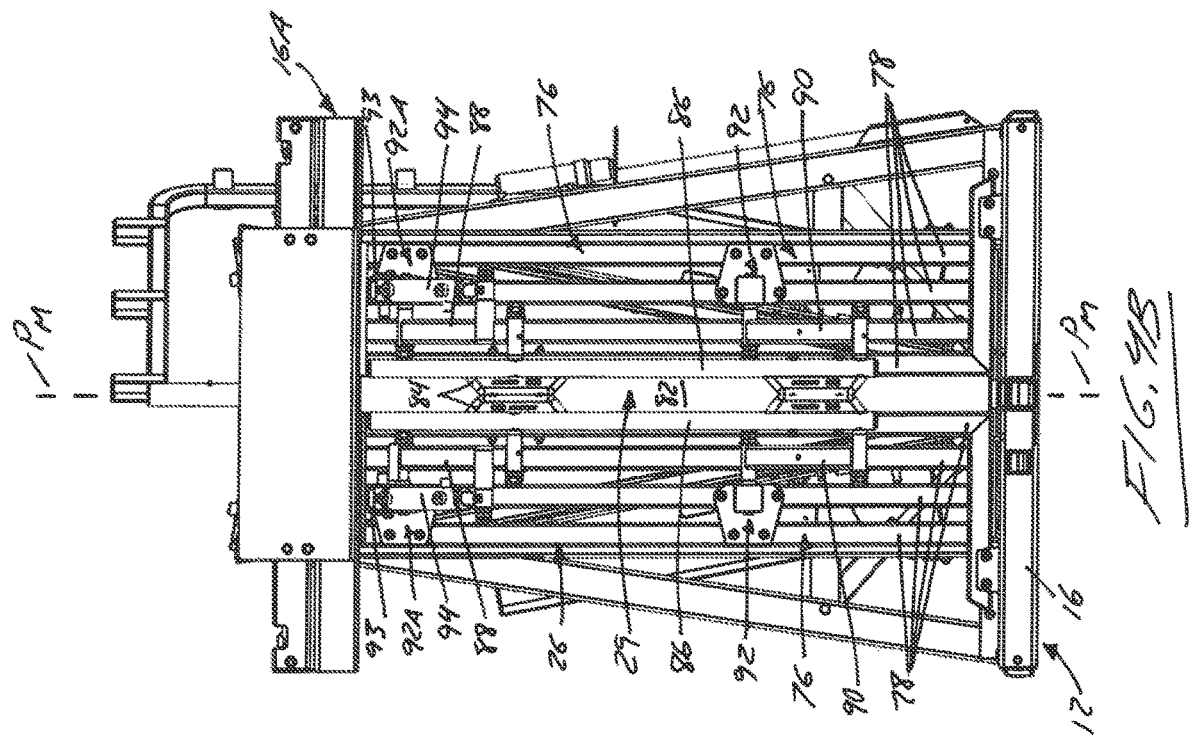
FIGS. 4A and 4B are front elevational views of the squeeze chute of FIGS. 1A and 1B, respectively.
Figure 4B:
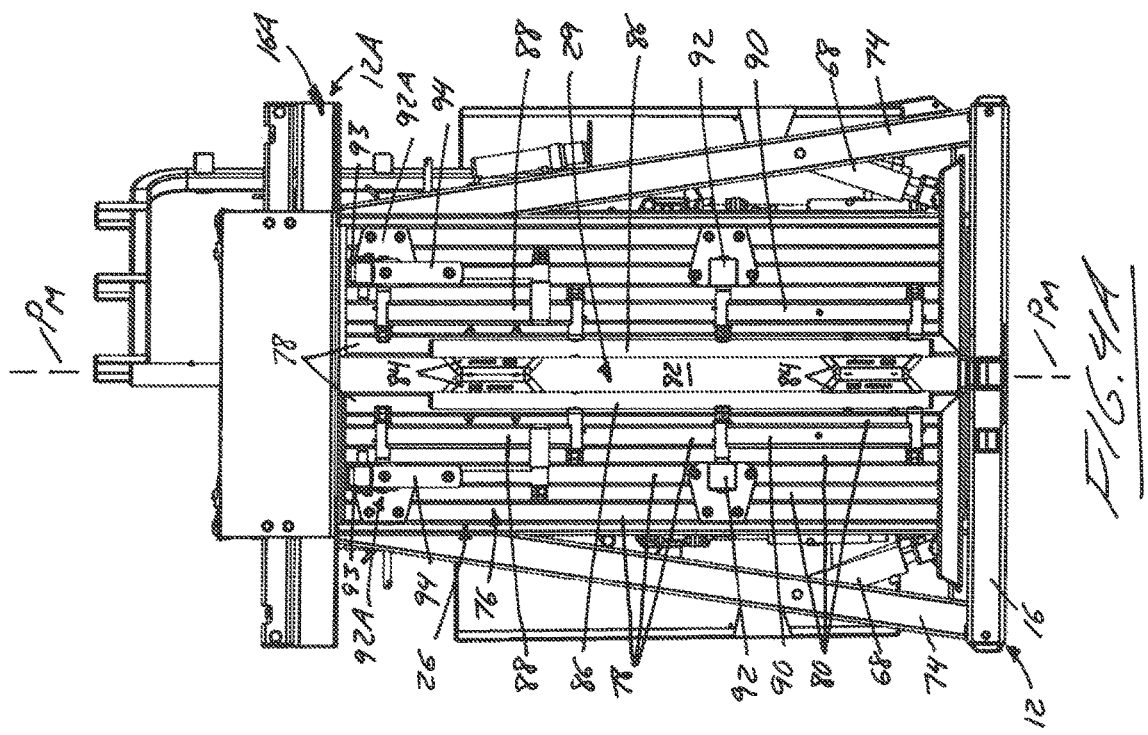

FIG. 1 shows a livestock squeeze chute 10 according to one embodiment of the present invention. In a known manner, the chute 10 has a stationary rigid framework with a rectangular ground-level base 12 featuring two elongated side beams 14 that lie parallel to one another in a longitudinal direction of the chute 10 and two shorter cross members 16 that perpendicularly interconnect the side beams 14 at respective ends thereof. These cross-members 16 lie perpendicularly transverse to the side beams in a lateral direction of the chute, and denote longitudinally opposing front and rear ends 18, 20 of the chute 10. At or near the corners of the rectangular base 12, four respective corner posts 22 stands vertically upward therefrom to carry an upper subframe 12A of generally matching rectangular configuration to the base 12. The upper subframe 12A thus has two longitudinal upper side beams 14A lying parallel to and above those of the base 12, and upper cross members 16A lying parallel to and above those of the base 12. At the rear end 20 of the chute, the cross-members 16, 16A and the upright corner posts 22 delimit a rectangular entrance opening of the chute, at which an entrance gate 24 is installed to selectively enable entrance of an individual livestock animal into the chute by opening of the entrance gate 24. Likewise, at the front end of the chute, the cross-members 16, 16a and the upright corner posts 22 delimit a rectangular exit opening of the chute, through which a livestock animal can exit the chute. This front end of the chute is also equipped with a head gate 26 that is operable to close against opposing sides of the animal's neck. In the illustrated embodiment, the entrance gate 24 and head gate 26 are hydraulically operated, though in other embodiments, a manually operated gate may alternatively be employed at one or both ends of the chute. A neck extender 27 is also installed at the front end of the chute to additionally position and stabilize the animal's head when the animal's is held stationary in the exit opening by the closed state of the head gate 26.

Suspended on the frame, at an elevational range thereof delimited between the base 12 and the upper subframe 12A, are a pair of movable squeeze panels 28, each lying longitudinally of the frame along a respective side thereof. The squeeze panels 28 are movably supported on the frame in a manner described in more detail below, and are movable toward and away from one another in the lateral direction of the chute. A squeeze space 29 delimited between the two squeeze panels 28 is thus adjustable in width by such movement of the squeeze panels toward and away from one another. Moving the squeeze panels away from one another widens the squeeze space 29 to enable initial admission of an animal to said squeeze space, while moving the squeeze panels toward one another constricts said squeeze space 29 after the animal has been admitted thereto. The two squeeze panels 28 thus push against the sides of the animal's body, thereby cooperating with the closed head gate 26 and neck extender 27 to hold the animal stationary in a secured position with their body standing in the squeeze area space of the chute 10, their neck reaching outwardly through the exit of the chute via a central opening in the head gate 26, and their head residing outside the chute beyond the exit thereof.

Each squeeze panel 28 has a framework featuring a generally rectangular perimeter structure composed of horizontal upper and lower beams 32A, 32B that lie parallel to the side beams 14, 14A of the frame, and end posts 34A, 34B that perpendicularly connect the upper and lower beams 32A, 32B together at the longitudinally opposing front and rear ends thereof. A set of multiple access gates collectively and substantially fill the interior panel space bound by the perimeter structure.

The illustrated example includes a plurality of horizontally-hinged front upper access gates 36 of uncladded skeletal structure, each comprising a parallel set of bars 36A, of which there are two per gate in the illustrated example. A pair of longitudinal mid-beams 37A, 37B of the squeeze panel's framework are situated at approximately mid-elevation thereon. These mid-beams 37A, 37B divide a front section the squeeze panel 28 into upper and lower areas, of which the upper area is occupied by the front upper access gates 36 when same are closed. In such closed positions of the upper access gates, the bars 36A thereof stand upright within the this upper area of the squeeze panel 28 that is delimited between the squeeze panel's upper beam 32A and the upper mid-beam 37A. Bottom ends of the upper access gates 36 are hinged to the upper mid-beam 37A for opening and closing about a longitudinally oriented pivot axis, and thus can be swung downwardly into open positions enabling access to the squeeze space 29 of the chute through the upper area of the squeeze panel's front section. The skeletal construction of the front upper access gates 36 allows visual sightline to the animal in the squeeze space even when these gates 36 are closed, while still partially obstructing the upper area of the squeeze panels' front section for protection of human operators.

A pair of vertically-hinged front lower access gates 40A, 40B occupy the lower area of the squeeze panel's front section below the lower mid-beam 37B. A front one of these lower access gates 40A is hinged to the front end post 34A of the squeeze panel, while the other rear one of the lower access gates 40B is hinged to an intermediate post 39 that resides intermediately between the front and rear end posts 34A, 34B of the squeeze panel framework at a rear end of the front section, and next to a divider post 41 that divides the front section of the squeeze panel from a neighbouring rear section. The front lower access gates 40A, 40B are of solidly cladded construction so as to fully obstruct the lower area of the squeeze panel's front section when these gates 40A, 40B are closed. Depending on whether upper body, lower body or full body access to the animal is required when securely held by the squeeze panels and head gate, a different combination of one or more of the front access gates 36, 40A, 40B of the squeeze panel 28 may be opened.

The rear section of each squeeze panel 28 features a full-height veterinary access gate 42 that spans a near entirety of the height between the upper and lower beams 32A, 32B of the squeeze panel's framework, and is pivotally coupled to these beams 32A, 32B, or to the rear end post 34B, for swinging movement about an upright axis parallel to the rear end post 34B. Opening of the veterinary access gate 42 enables human access to a rear inspection region of the squeeze space 29 that neighbours the entrance of the chute, and from which a veterinarian can inspect and treat the rear of the animal that is being held in the front holding region of the squeeze space 29 by the closed head gate 26 and the squeeze panels 28. In the illustrated embodiment, the upper beam 32A of the squeeze panel framework is composed of two distinct sections, a front upper beam 38A spanning from the front end post 34A to the divider post 41, and a rear upper beam 38B that spans from the divider post 41 to the rear end post 34B. The rear upper beam 38B resides at slightly greater elevation than the front upper beam 38A. The divider post 41 and the rear end post 34B are thus somewhat taller than the front end post 34A, and the resulting greater height of the squeeze panel's rear section relative to the front section serves to maximize the height of the doorway space through which the rear inspection region of the squeeze space 29 is accessed when the veterinary access gate 42 is opened. This need not be the case however, and the squeeze panel may have a consistent height throughout, in which case a singular upper beam 32A may span fully from the front end post 34A to the rear end post 34B.

In the illustrated embodiment, each veterinary access gate 42 is comprised of an uncladded skeletal upper portion 44 and a solid cladded lower portion 46 therebelow. The uncladded skeletal upper portion 44 delimits an open rectangular space normally occupied by one or more smaller sub-gates 48, for example of the same or similar construction to the front upper access gates 36. The entire veterinary access gate 42 can thus be opened to gain walk-in access to the rear inspection region of the squeeze space 29, or the sub-gates 48 alone can be opened to enable upper visual or manual access to the inspection region, while leaving intact the kick protection afforded by the solid cladded lower portion 46 of the veterinary access gate 42.

Having described the structure of both the chute frame and the squeeze panels 28, attention is now turned to novel details concerning how the squeeze panels 28 are supported on the frame, and are uniquely movable into different operating positions depending on whether the operator wants to use the chute in a parallel-squeeze mode or V-squeeze mode. Each of the squeeze panels has a set of angled hangers 50 affixed to the upper beam 32A thereof at longitudinally spaced positions therealong. Each angled hanger 50 angles obliquely from the upper beam 32A of the squeeze panel at an angle of upward and inward incline toward a vertically and longitudinally oriented midplane $P_M$ of the chute, across which the two squeeze panels 28 are symmetrically disposed, as are the side beams 14 of the base 12 and upper side beams 14A of the upper subframe 12A. So, unlike the various framework members 32A, 32B, 34A, 34B, 37A, 37B, 39, 41 of the squeeze panel that all reside in a shared common plane ("the plane of the squeeze panel", for brevity), the angled hangers 50 deviate from this plane at an oblique angle thereto. An upper end of each angled hanger 50 is pivotally coupled to a respective upper support unit 52, which is slidably or rollingly engaged with one of a plurality of overhead support tracks 54 that span between the two longitudinal side beams 14A of the upper subframe 12A of the chute's frame structure. In the illustrated embodiment, each overhead support track 54 is formed by two C-shaped channels 56 whose open sides face toward one another in the longitudinal direction of the chute. The supper support unit 52 engaged to the support track 54 comprises a pair of rollers 58 each respectively received in one of the C-shaped channels 56 for rolling support along the bottom flange thereof, and an axle 60 that interconnects the two rollers 58 and in penetrating fashion through the respective angled hanger 50 near the top end thereof. An axis of the axle 60 lies longitudinally of the chute, and serves as both a rotational axis of the two rollers 58, and a pivot axis about which the squeeze panel and its attached hangers 50 are pivotable.

In the illustrated embodiment, each squeeze panel 28 has two angled hangers 50, which align with the two angled hangers of the other squeeze panel 28, and each of the overhead support tracks 54 carries a respective two of the support units 52, one for each squeeze panel 28. It will be appreciated that the number of angled hangers 50, support units 52 and overhead support tracks 54 may be increased to more than two. While the illustrated embodiment employs rolling support units 52 with rotatable rollers 58 that can roll back and forth on the support tracks 54, a variant may instead employ sliding support units each having one or more sliders that simply slide back and forth on the support track 54 without rotation. Also, while use of two rollers or sliders for each support unit on opposing sides of the respective angled hanger 50, so as to engage with respective halves of a split dual-piece track 54, may be preferable for optimal alignment and balance, it will be appreciated a singular roller or slider on a single-piece support track may alternatively be used for each support unit 52.

An angled actuator bracket 62, like the angled hangers 50, is affixed to the upper beam 32A of each squeeze panel 28, preferably at a central position between the two angled hangers 50, and diverges from the plane of the squeeze panel at same oblique angle thereto, and reaches an equal or similar distance therefrom, as the angled hangers 50. A distal end of the actuator bracket 62 of each squeeze panel has a first end of a respective upper actuator 64 pivotally coupled thereto by a pivot pin 65 whose axis is parallel to, and coincident with or closely adjacent to, the axle axes of the support units 52 of the same squeeze panel. The second end of each upper actuator 64 is pivotally coupled to the upper beam 14A situated oppositely of the squeeze panel 28 to whose actuator bracket 62 the upper actuator's first end is coupled. For the purpose of such connection, an upstanding connection lug 66 is affixed to the upper beam 14A to stand upwardly therefrom and receive the second end of the upper actuator 64. Extension of each upper actuator 64 thus pushes the upper end of the respective squeeze panel 28 outwardly away from the midplane $P_M$ of the chute, and thus also displaces the support units 52 of that squeeze panel outwardly along the respective overhead support track 54 in the same outward direction away from the midplane $P_M$. By contrast, collapse of each upper actuator 64 pulls the upper end of the respective squeeze panel 28 inwardly toward the midplane $P_M$ of the chute, and thus also displaces the support units 52 of that squeeze panel 28 inwardly along the respective overhead support track 54 in the same inward direction toward the midplane $P_M$. Optionally, the hydraulic control circuitry of the chute may be specifically configured to operate the two upper actuators 64 synchronously of one another to adjust the upper ends of the two squeeze panels 28 in symmetric fashion across the midplane $P_M$ of the chute. Alternatively, the hydraulic circuitry may retain operator ability to operate the two upper actuators independently of one another to give the operator greater flexibility in the chutes overall operative range of attainable squeeze shapes, including shapes involving non-symmetric positions of the two squeeze panels 28.

The bottom ends of the two squeeze panels 28 are also adjustable in position relative to the midplane $P_M$ of the chute by way of a respective set of hydraulic actuators. For such purpose, the lower beam 32B of each squeeze panel has two lower actuators 68 pivotally coupled thereto at or adjacent the longitudinally opposing front and rear ends of the lower beam 32B. At or adjacent each of these front and rear ends, the lower beam 32B of each squeeze panel 28 features respective outwardly jutting connection lugs 70 to which bottom ends of the lower actuators 68 are pivotally coupled by respective pivot pins whose axes are longitudinally oriented and coincident with one another. These aligned pivot pins thus define a lower pivot axis of about which the squeeze panel 28 is pivotable, in additional to being pivotable about the upper pivot axis defined by the overhead support units 52 from which the squeeze panel 28 is hung. Top ends of the lower actuators 68 are pivotally coupled to static members of the chute's framework at or near the respective entrance and exit ends thereof. In the illustrated example, the lower actuators are specifically coupled to obliquely angled outer frame members 74 whose bottom ends are rigidly attached to the cross-members 16 of the ground level base 12 at outermost ends thereof. The angled frame members 74 span upwardly from the ground level base 12 at inwardly inclined angles, and join up with the corner posts 22 of the chute's framework. The lower actuators 68 are pivotally coupled to the angled frame members 74 at a fixed elevation thereon that always exceeds the elevation of the squeeze panel's actuator-connected lower beam 32B, regardless of where the squeeze panel resides within its available range of motion, hence reference to the two opposing ends of each lower actuator 68 as top and bottom ends, since the top end always remains above the bottom end thereof throughout the available range of motion of both the actuator and the squeeze panel.

The overall types, range and direction of motion available to each squeeze panel 28 in the illustrated embodiment are thus dictated by a combination of the upper actuator induced lateral displacement of the overhead support units 52 from which the squeeze panel 28 is hung in a pivotal manner about the upper pivot axis, the outward offsetting of the plane of the squeeze panel at a radial distance from the upper pivot axis due to the divergently angled relationship of the angled hangers 50 to the plane of the squeeze panel 28, pivotal movement of the squeeze panel about is lower pivot axis, and lower actuator induced pivoting of the squeeze panel about its upper pivot axis. Making use of this manoeuvrability of both squeeze panels 28, the panels can be moved between a parallel-squeeze configuration residing parallel to one another in respective vertical planes, as shown in FIGS. 1A, 2A, 3A, 4A, 5A and 6A, and a V-squeeze configuration residing in non-parallel upwardly divergent relation to one another in respective inclined planes, as shown in FIGS. 1B, 2B, 3B, 4B, 5B and 6B; and can be laterally displaced toward and away from one another in the parallel-squeeze configuration, and laterally tilted toward and away from one another about their lower pivot axes in the V-squeeze configuration. In the illustrated embodiment, all of this is possible while also maintaining minimal gap spacing between the bottom ends of the two squeeze panels 28 and a floor 75 of the chute that spans horizontally between the side beams 14 of the base 12, thereby minimizing potential foot hazards to the livestock.

FIGS. 1A, 2A, 3A, 4A, 5A and 6A show the chute 10 in the parallel-squeeze configuration, and with the squeeze panels situated at their fully retracted positions of furthest relation from one another to maximize the uniform width of the rectangular parallelopiped squeeze space 29 that resides between them in the parallel-squeeze configuration. This fully retracted parallel-squeeze state is achieved by full collapse of the lower actuators 68 and nearly full extension of the upper actuators 64, so as to place the upper beams 32A of the two squeeze panels 28 in general alignment beneath the longitudinal side beams 14A of the upper subframe 12A of the chute's framework, and place the lower beams 32B of the two squeeze panels 28 in general alignment over the longitudinal side beams 14 of the ground level base 12 of the chute's framework. To close the two squeeze panels 28 toward one another and constrict the squeeze space 29, while maintaining a fully or substantially parallel relationship between the two squeeze panels for a parallel-squeeze operation in which the width of the squeeze space is reduced generally uniformly over the full height thereof, extension of the lower actuators 68 is performed simultaneously with collapse of the upper actuators 64. This simultaneously pushes and pulls on the bottom and top ends of the squeeze panels 28, respectively, so that the top and bottom ends move in full or near synchronicity with one another to generally maintain the vertical orientations of the squeeze panels as they move toward one another. To subsequently retract the two squeeze panels 28 away from one another and widen the squeeze space 29, again while fully or substantially maintaining their parallel vertical orientations, collapse of the lower actuators 68 and extension of the upper actuators 64 are performed simultaneously in order to pull and push on the bottom and top ends of the squeeze panels, respectively, to move them simultaneously outward in full or near synchronicity while fully or substantially maintaining their parallel relationship.

FIGS. 1B, 2B, 3B, 4B, 5B and 6B show the chute 10 in the V-squeeze configuration, and with the top ends of the squeeze panels situated at their fully retracted positions of furthest relation from one another to maximize the top width of the downwardly-tapered squeeze space 29 that resides between them in the V-squeeze configuration. This fully retracted V-squeeze state is achieved by nearly full extension of the upper actuators 64 so as to place the upper beams 32A of the two squeeze panels 28 generally beneath the longitudinal side beams 14A of the upper subframe 12A of the chute's framework, together with extension of the lower actuators 68 from their fully collapsed states so as to push the bottom ends of the two squeeze panels inwardly from the longitudinal side beams 14 of the ground level base 12 of the chute's framework toward the midplane $P_M$ of the chute. This places the squeeze panels in inclined planes of upwardly divergent relation to one another to form a V-like shape, best seen in FIGS. 5B and 6B. To close the two squeeze panels toward one another and constrict the squeeze space 29, a V-squeeze operation involves angular tilting of the two squeeze panels 28 toward one another about their respective lower pivot axes, rather than the lateral linear displacement that is performed in a parallel-squeeze operation. Accordingly, in a V-squeeze operation, the lower actuators 68 are locked and held at a static length in order to hold the bottom ends of the squeeze panels 28 stationary, thereby also statically maintaining the positions of lower pivot axes of the squeeze panels 28. With the lower actuators 68 so locked, the upper actuators 64 are collapsed to pull the top ends of the two squeeze panels 28 together, thus reducing the width of the downwardly tapered squeeze space 29 between them. To subsequently retract the two squeeze panels 28 away from one another in angularly tilting fashion to widen the squeeze space 29, while maintaining an upwardly divergent panel relationship, the lower actuators 68 are again maintained in their locked state, while the upper actuators 64 are extended in order to push the top ends of the two squeeze panels 28 apart, thus increasing the width of the downwardly tapered squeeze space 29 between them.

FIG. 5C illustrates how the novel chute 10 of the illustrated embodiment is also capable of attaining an inverted-V squeeze configuration, where instead of the squeeze panels residing in upwardly divergent relation to one another to delimit a downwardly tapered squeeze space of V-like shape that's narrowest at its bottom end and widest at its top end, the squeeze panels instead reside in an upwardly convergent relation to one another to delimit an upwardly tapered squeeze space of inverted V-like shape that widest at its bottom end and narrowest at its top end. The top ends of the squeeze panels are shown situated at their fully closed positions of nearest relation from one another across the mid-plane $P_M$ of the chute to minimize the top width of the upwardly-tapered squeeze space 29 that resides between them in the inverted-V squeeze configuration, with the bottom ends of the squeeze panels in their fully retracted positions. This fully retracted state of the inverted-V squeeze configuration is achieved by full collapse of the upper actuators 64 so as to place the upper beams 32A of the two squeeze panels 28 closely adjacent the midplane $P_M$ of the chute, together with full collapse of the lower actuators 68 to place the lower beams 32B of the two squeeze panels 28 in general alignment over the longitudinal side beams 14 of the ground level base 12 of the chute's framework. To close the two squeeze panels toward one another and constrict the squeeze space 29, an inverted-V squeeze operation involves angular tilting of the two squeeze panels 28 toward one another about their respective upper pivot axes. Accordingly, in an inverted-V squeeze operation, the upper actuators 64 are locked and held at a static length in order to hold the top ends of the squeeze panels 28 stationary, thereby also statically maintaining the positions of upper pivot axes of the squeeze panels 28. With the upper actuators 64 so locked, the lower actuators 68 are extended to push the bottom ends of the two squeeze panels 28 together, thus reducing the width of the upwardly tapered squeeze space 29 between them. To subsequently retract the two squeeze panels 28 away from one another in angularly tilting fashion to widen the squeeze space 29, while maintaining an upwardly convergent panel relationship, the upper actuators 64 are again maintained in their locked state, while the lower actuators 68 are collapsed in order to pull the bottom ends of the two squeeze panels 28 apart, thus increasing the width of the upwardly tapered squeeze space 29 between them.

While V-squeeze and inverted-V squeeze operations above are described as holding one set of actuators locked at a static length to maintain a static pivot axis about which the panels are swung in purely pivotal fashion using other set of actuators, whereby the minimum width of the squeeze space at the narrower one of either its top or bottom end is substantially maintained while the maximum width of the squeeze space at the wider one of its top or bottom end is adjusted via the upper the lower actuators, it will be appreciated that both sets of actuators may be operated during the squeeze operation in order to change the taper angle of the squeeze space not only via adjustment of the space's maximum width, but also through change the of the squeeze space's minimum width, for example to best suit the body shape of the particular livestock animals concerned.

The use of the angled hangers 50 to offset the upper pivot axis of each squeeze panel 28 inwardly from the plane of the squeeze panel 28 has multiple benefits. Firstly, shorter overhead tracks 54 can be used than if the upper pivot axis were to reside in the plane of the squeeze panel, as best seen with reference to FIG. 5B, where the angled hangers 50 mean that the support units 52 reside closer together than they otherwise would if the hangers were coplanar with the squeeze panel 28. The support tracks 54 and supports units 52 can thus all be retained entirely within the footprint of the upper subframe 12A of the chute, without having to widen same, thus denoting the beneficial space and material efficiency of the illustrated design. Secondly, if the upper pivot axis resided in the plane of the squeeze panel 28, then the arcuate path followed by the lower end of the squeeze panel 28 when initially pushed inward by the lower actuators 68 during transition from the parallel-squeeze configuration of FIG. 5A to the V-squeeze configuration of FIG. 5B, or during initial squeeze space constriction during an inverted-V squeeze operation, would have an upwardly swinging trajectory, thus immediately lifting the bottom end of the squeeze panel 28 further from the chute floor 75. In other words, the bottom end of the squeeze panel 28 would start at bottom dead center in a vertical plane containing the upper pivot axis. However, with the offset relationship between the upper pivot axis and the plane of the squeeze panel 28, the bottom end of the squeeze panel 28 of the illustrated embodiment first swings downwardly toward bottom dead center, before swinging upwardly therefrom.

Accordingly, the difference in elevation of the squeeze panel's bottom end at the extremes of the squeeze panel's angular range of pivotal motion about the upper pivot axis is lesser in the illustrated embodiment, where bottom dead center resides midway between the two extremes, compared to alternative implementations lacking the aforementioned offset and having bottom dead center at one extreme, which would result in a greater gap space between the squeeze panel 28 and the chute floor 75 at the other extreme than occurs anywhere within the angular range of the preferable illustrated embodiment. That being said, despite there being these clear advantages to the offsetting of the squeeze panel plane from the squeeze panel's upper pivot axis, other embodiments need not necessarily have such geometric relationship, and yet still be functionally capable of achieving a convertible chute whose squeeze panels are similarly hung from above in both pivotable and displaceable fashion with the bottom ends also repositionable, so as to thereby enable both parallel-squeeze and V-squeeze operability in the same chute.

The head gate 26 comprises two gate panels 76 that are each displaceable back and forth in the lateral direction via a respective roller carriage that is attached to the top end of the gate panel 76, and rolls back and forth along the respective upper cross-member 16A at the exit end of the chute. Each gate panel 76 has an uncladded skeletal structure composed of a plurality of vertically upright bars 78 residing side-by-side in a shared vertical plane of lateral orientation. These bars 78 reside at horizontally spaced intervals from one another, thus leaving vertically elongated slot-shaped openings 80 between the adjacent bars 78. Such openings 80 allow ambient environmental light to enter the chute through the exit thereof for the purpose of enticing animals to travel forwardly through the chute from the entrance to the exit. In the illustrated embodiment, the entrance gate 24 is of the same construction of the exit gate, thus likewise having uncladded skeletal gate panels 76 with parallel upright bars 78 and light-admitting openings 80 therebetween, though the entrance and exit gates 24, 26 need not necessarily be of the same type.

The neck extender 27 is installed on the head gate 26 at the front side thereof, i.e. the side thereof opposite the interior squeeze space of the chute. The neck extender 27 is composed of two halves that are respectively installed on the two gate panels 76, and that are of symmetrical relation to one another across the midplane $P_M$ of the chute. The two gate panels 76 are likewise symmetric across the midplane $P_M$ of the chute, and reside on opposite sides of a central opening 82 of the head gate that is bisected by this midplane $P_M$. Each gate panel 76 may have a bumper 84 installed thereon at an inner edge thereof that neighbours the central opening 82, so that in a fully closed state of the head gate 26, the respective bumpers 84 on the inner edges of the two gate panels 76 abut one another across the central opening 82. The bumpers 84 are preferably included only at a relatively high elevation on the gate panels 76, thus leaving lower and middle elevational regions of the central opening 82 unobstructed to accommodate the animal's neck therein in a manner directly abutted by the inner edges of the gate panels themselves.

Each half of the neck extender 27 features a neck bar 86 of generally vertical orientation residing adjacent a respective side of the central opening 82 in front of the innermost bar 78 of the respective gate panel 76, i.e. the bar 78 thereof that defines the bumper-equipped inner edge of the gate panel 76. Each neck bar 86 is preferably a round bar, whose width (i.e. diameter) preferably doesn't exceed with the width of the innermost gate panel bar 78 in front of which it resides, whereby the width of the neck bar 86 doesn't obstruct any part of the neighbouring opening 80 in the gate panel's skeletal structure. Each neck bar 86 is supported by a pair of parallel support links, of which one is referred to as an upper support link 88 and the other of which is referred to as a lower support link 90, since the latter resides at a lower elevation than the former. A proximal end of each support link 88, 90 is pivotally connected to the respective gate panel 76 by a respective mounting bracket 92, 92A that is affixed to the bars 78 of the gate panel. Each support link 88, 90 is pivotable about a horizontal pivot axis oriented in the lateral direction of the chute.

About this pivot axis, each support link 88, 90 is pivotable between a stowed position hanging alongside the front of the head gate panel 76 in parallel and generally flush relation against, or closely adjacent to, one of the bars 78 thereof; and a deployed position angling forwardly and downwardly outward from the front side of the respective gate panel 76. The width of each support link 88, 90 doesn't exceed the width of the gate panel bar 78 in front of which it resides, again so as not to obstruct either of the neighbouring openings 80 of the gate panel's skeletal construction. An opposing distal end of each support link 88, 90 is pivotally coupled to the respective neck bar 86 at a respective elevation thereon. The distal end of the upper support link 88 is connected to the neck bar 86 at a higher elevation thereon than the distal end of the lower support link 90. The pivot axes of these connections of the support links 88, 90 to the neck bar 86 are parallel to those of the support links' pivotal connections to the gate panel 76. The vertical spacing between the pivotal connections of the two support links 88, 90 to the gate panel 76 is equal the vertical spacing between their pivotal connections to the neck bar 86, whereby the support links 88, 90 and the neck bar 86 form a parallelogram linkage, by which the neck bar 86 remains in the same vertical orientation parallel to the gate panel bars 78 throughout the linkage's full range of motion.

In addition to the neck bar 86 and the two support links 88, 90, each half of the neck extender 27 features a respective hydraulic actuator 94. An upper end of the hydraulic actuator 94 is pivotally coupled to the respective gate panel 76, for example using a same mounting bracket 92A shared by the respective upper support link 88. This pivotal connection allows movement of the actuator 94 about another laterally oriented horizontal pivot axis. A lower end of the actuator 94 is pivotally coupled to the upper support link 88 at a distance from the pivotally mounted proximal end thereof. The mounting bracket 92A for the actuator 94 features an upwardly and forwardly inclined arm 93 that reaches outwardly and upwardly from the gate panel 76 to receive pinned connection of the actuator's upper end at a location spaced upwardly and forwardly from the pivotally supported proximal end of the upper support link 88, which may be pivotally pinned to the same arm 93, but closer to an originating end thereof nearest to the gate panel 76. This way, the actuator 94 is oriented in non parallel relation to the upper support link 88 in order to be able to exert moment forces about the upper support link's pivot axis, and thereby control movement of the upper support link 88.

Collapse of the actuator 94 is operable to pull the distal end of the upper support link 88 upwardly and outwardly out of the stowed position and into the deployed position. From the deployed position, extension of the actuator 94 is operable to push the distal end of the upper support link 88 downwardly back toward the respective gate panel, and thus back into the stowed position hanging thereagainst or thereadjacent. The actuator-driven movement of the upper support link 88 causes matching synchronous movement of the lower support link 90 via the neck bar 86 that is connected therebetween. The two actuators 94 of the two halves of the neck extender are operated synchronously so that the two halves of the neck extender likewise move simultaneously and synchronously. Accordingly, collapse of the actuators 94 to lift the upper support links 88 acts to swing the two neck bars 86 forwardly and upwardly away from the front of the head gate 26 on an arcuate path, while maintaining a vertical orientation of the neck bars 86 throughout such arcuate movement. When an animal's neck is held between the two gate panels 76 of the closed head gate 26, such movement of the neck bars 86 pushes against the back of the animal's head in an upward and forward direction, thus raising the animal's head and stretching the animals neck until extended far enough to hold the head stable in this raised position.

Each actuator 94 resides in front of the third innermost bar 78 of the respective gate panel, i.e. in front of a gate panel bar 78 of neighbouring relation to that in front which the upper support link 88 resides, and preferably has a diameter that doesn't exceed, or at least doesn't notably exceed, the width of the gate panel bars 78. Once again, this has the desired result of zero or minimal obstruction to the neighbouring openings 80 of the gate panel's skeletal construction on either side of the bar 78. This alignment of the neck bars 86, support links 88, 90 and actuator 94 in front of respective bars 78 of the gate panel's skeletal construction maximizes the overall unobstructed area of the upright slot-like openings 80 in the gate panel, thereby maximizing light admission through the skeletal gate panel 76 into the chute 10. Additionally, by mounting the actuators 94 high up on the gate panels 76 near the top ends thereof in downwardly-hanging orientations with their bottom ends connected to the upper links 88, the actuators 94 drive movement of the upper support links 88 from above. Such elevated mounting of the actuators 94 for operation in upward-pulling fashion to move the neck extender into its deployed working position means that the actuators 94 reside at an upper region of the head gate that is of non-obstructive relation to the normal sightline of animals entering and moving through the chute, as their usual sightline would be looking forwardly through a lower or middle elevational region of the head gate. As shown, the neck bars 86 may have respective bumpers 84 thereon near the bottom ends thereof to abut against one another in the fully closed position of the head gate 26.

Figure 8A:
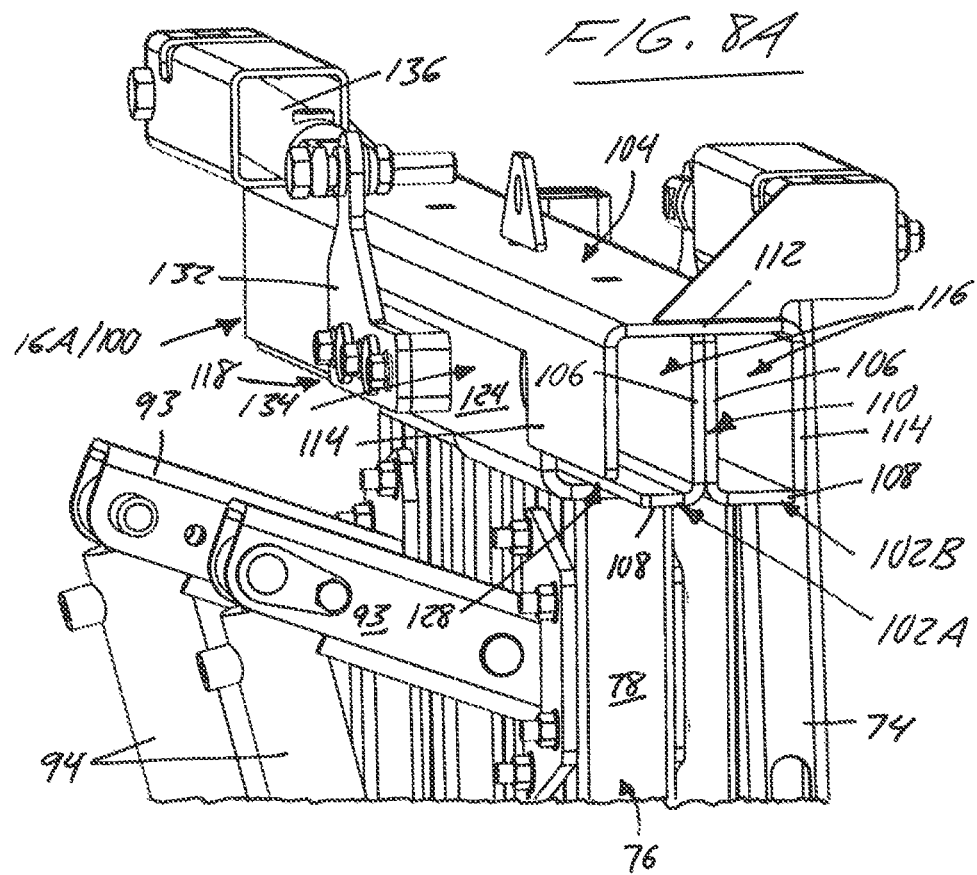
FIGS. 8A and 8B are closeup side perspective views, respectively, of the head gate illustrating an overhead guide track thereof, of which FIG. 8B omits a top channel-shaped track cover to reveal internal details of the track.
Figure 8B:
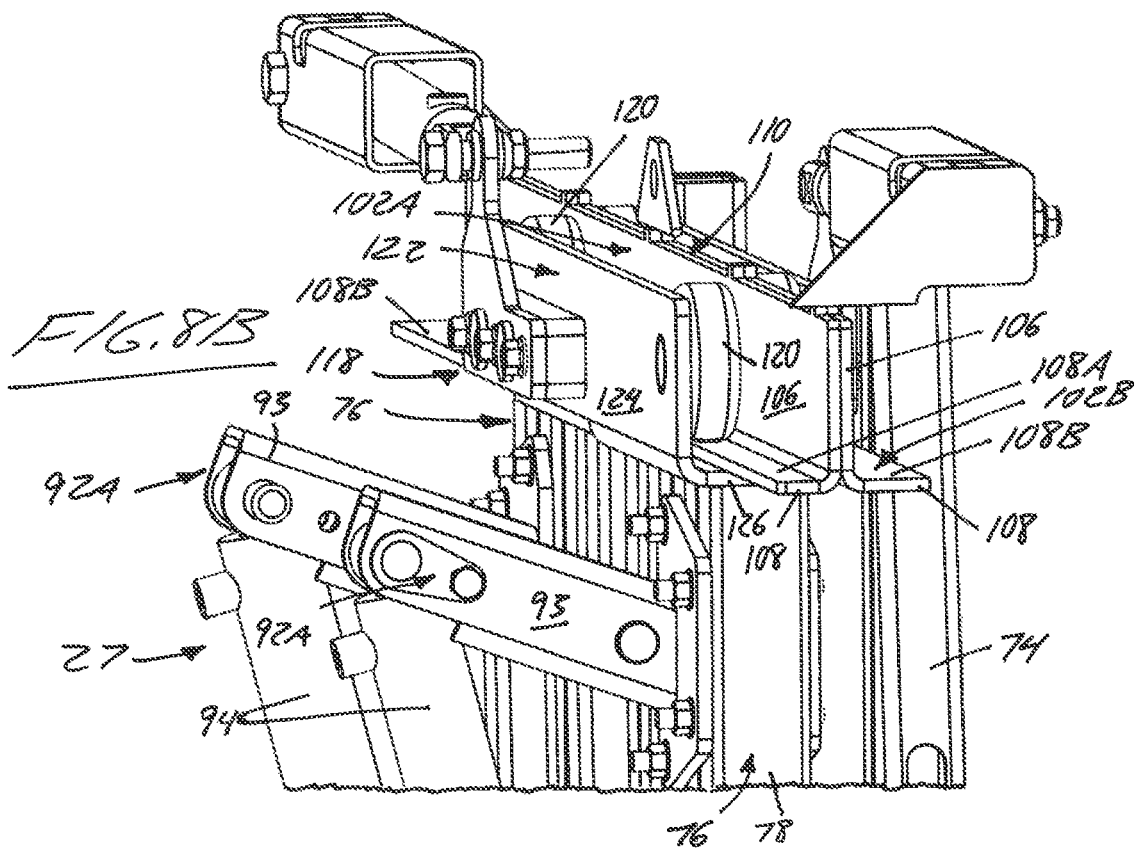

In addition to the novel neck extender 27 design, the head gate 26 and entrance gate 24 in the illustrated embodiment include novel construction aspects concerning, including unique design of the upper cross-members 16A to define a robust overhead guide track 100 on which the roller carriages of the two gate panels 76 roll back and forth during opening and closing of the gate. FIGS. 7 through 9 illustrate the head gate 26 in isolation from the rest of the chute to illustrate these construction details. Though these figures show the head gate 26 with the neck extender 27 installed thereon, it will be appreciated that the same construction can be employed for the entrance gate, or for a head gate 26 that either lacks any sort of neck extender 27, or employs another style of neck extender that differs from the illustrated embodiment.

The upper cross-member 16A at each end of the chute's upper subframe 12A defines the overhead guide track 100 for the respective gate 24, 26, and is of a particularly novel construction that provides a robust head gate design capable of handling heavy animal impact against the gate without detriment to the structural integrity or reliable operability thereof. The guide-track 100 is composed of a pair of L-shaped bars 102A, 1026, for example made of steel angle, and a cooperating U-shaped track cover 104, for example made of steel U-channel or C-channel. Preferably, the steel angle and steel channel have a thickness of at least ⁵⁄₁₆-inch, and in one particular but non-limiting embodiment, a thickness of ⅜-inch. These three components are fixed together, for example by welding, and extend parallel to one another in the lateral direction of the chute. Each L-shaped bar 102A, 1026 has an L-shaped cross-section composed of an upright leg 106, and a lateral leg 108 jutting outward from a lower end of the upright leg. The two L-shaped bars are welded together in positions placing their respective upright legs back-to-back with one another, whereby the lateral leg 108 of the front L-shaped bar 102A juts forwardly of the chute's longitudinal direction, while the lateral leg 108 of the rear L-shaped bar 102B juts oppositely rearward of the chute's longitudinal direction. The back-to-back upright legs 106 of the L-shaped bars 102A, 1026 form a central divider wall 110 of the track 100, from which the lateral legs 108 of the first and second L-shaped bars jut outwardly in opposing directions. The topsides of these lateral legs 108 define two respective rail surfaces on opposing sides of the divider wall 110. These rail surfaces each receive the rollers of a respective one of the gate panel roller carriages, as explained in more detail below.

The track cover 104 has a U-shaped cross-section composed of a central web 112 with two flanges 114 jutting therefrom in a same direction at opposing ends of the central web. The track cover 104 resides overtop of the two L-shaped bars 102A, 1026 in a downwardly-opening orientation in which the central web 110 of the track cover 104 spans across a top end of the divider wall 110, while the flanges 114 of the track cover 104 hang downwardly from the central web 112 on the opposing sides the divider wall 110. Each downwardly hanging flange 114 of the track cover 104 resides across a respective one of the rail surfaces from the divider wall 110. The L-shaped bars and U-shaped track cover 104 thus cooperatively form two enclosed channels 116 on opposing sides of the divider wall 110. The interior space of each enclosed channel 116 is vertically bound between the web 112 of the U-shaped track cover 104 and the lateral leg 108 of a respective one of the two L-shaped bars 102A, 102B, and is horizontally bound between the divider wall 110 and a respective one of the track cover's two hanging flanges 114. The rail surface at the topside of the lateral leg 108 of each L-shaped bar thus defines a floor of a respective one of the two enclosed channels.

Each gate panel 76 has a respective roller carriage 118 that is attached at a top end of the gate panel 76, and features at least two rollers 120 that reside within a respective one of the guide track's two enclosed channels 116, and thus can roll back and forth on the respective rail surface at the floor of that channel 116. Each roller carriage 118 is further composed of a hanger bracket 122 that is elongated in the laterally-oriented travel direction of the guide track, and that possesses an L-shaped cross-section over a portion over a portion of its length. An upper leg 124 of the hanger bracket's L-shaped cross-section stands vertically upright has the two rollers 120 rotatably coupled thereto at one side thereof. Meanwhile, a lower leg 126 of the hanger bracket's L-shaped cross-section projects perpendicularly and horizontally from the upper leg 124 at a bottom end thereof, and underlies the lateral leg 108 of the L-shaped bar of the respective channel 116 in which the carriage's two rollers 120 are disposed. The lower leg 126 of the hanger bracket 122 is attached to the top end of the respective gate panel 76, for example by way of welded attachment to the top ends of the gate panel bars 78, though it will be appreciated that the novel overhead guide and track and cooperating roller carriages may be used on any variety of gate panel types, and not just the skeletal gate panels 76 of the illustrate embodiment. This L-shaped portion of the hanger bracket 122 thus allows each gate panel 76 to be carried directly beneath the guide track 100 on which the gate panels 76 roll back and forth via their respective roller carriages 118.

The upper leg 124 of each hanger bracket 122 reaches into the interior space of the respective enclosed channel 116 via an admission slot 128 that runs along the bottom of the channel. In the illustrated example, this admission slot 128 resides at an outer bottom corner of the enclosed channel, i.e. the bottom corner thereof furthest from the divider wall 110, and is defined by a gap intentionally left between the respective flange 114 of the U-shaped track cover 104 and a free end of the lateral leg 108 of the respective L-shaped bar 102A, 102B. The admission slot 128 of each enclosed channel 116 does not span the full length thereof, instead spanning only a partial length thereof starting from one end of the guide track 100, but terminating short of the guide track's other opposing end. For such purpose, the lateral leg 108 of each L-shaped bar 102A, 102B is not uniform over the full length thereof, and instead is composed of a narrower portion 108A that stops short of the respective flange 114 of the track cover 104 to leave the open gap that defines the admission slot 128, and a wider portion 108B that instead spans a substantially full distance from the divider wall 110 to the respective flange 114 of the track cover 104. The two L-shape bars 102A, 102B are reverse of one another in terms of which end of the track is occupied by the narrower portion 108A of its lateral leg 108, and which end of the track is occupied by the wider portion 108B of its lateral leg 108. Likewise, the admission slots 128 of the two enclosed channels thus start from opposing ends of the guide track 100. The point at which each L-shaped bar 102A, 102B transitions from its wider portion 108B to its narrower portion 108A creates a stop shoulder 130, by which displacement of the respective roller carriage 118 along the guide track 100 is limited in a closing direction of the gate, by eventual contact of the upper leg 124 of the carriage's hanger bracket 122 with this stop shoulder 130.

The L-shaped portion of each hanger 122 bracket spans only the width of the respective gate panel 76 to establish connection of the hanger bracket 122 thereto, and thus terminates at the inner edge of the gate panel 76. From thereon, only the upper leg 124 of the hanger bracket 122 continues onward past the inner edge of the gate panel 76 to form an extension portion of the hanger bracket 122 that extends from the L-shaped gate-supporting portion of the hanger bracket toward the other gate panel 76. This extension portion of the hanger bracket has attached thereto an actuator bracket 132, specifically at an outer side of the hanger bracket 122 that faces away from the guide track's divider wall 110, and thus faces oppositely of an inner side of the hanger bracket at which the two rollers 120 are carried. Each flange 114 of the track cover 104 has an elongated rectangular cut-out 134 therein at an intermediate region along the track length. Here, the flanges 114 of the track cover 104 are of reduced height relative to full-height outer regions of the flange 114 that reside on either side of this cut-out 134. Since the flanges 114 respectively define outer walls of the two enclosed channels 116 of the guide track, these cut-outs 134 thus define elongated openings in the outer sides of the two enclosed channels 116, through which the actuator brackets 132 are fastened to the hanger brackets 122 of the roller carriages. Outside the respective enclosed channel 116, each actuator bracket 132 extends upwardly from the hanger bracket 122 to an elevation above the track cover 104, where the displaceable output end of a respective hydraulic gate actuator 136 is coupled to the actuator bracket 132. An opposing fixed end of each gate actuator 136 is rigidly mounted to the guide track 100 in external relation thereto above the track cover 104 thereof, and more specifically in offset relation to either the front or rear side of the track 100 in order to connect to the respective actuator bracket 132 that protrudes through the respective outer wall cut-out 134 at either the front or rear side of the track 100.

The fixed end of each gate actuator 136 resides on a side of the chute's midplane $P_M$ that is opposite of the respective gate panel 76 whose movement is controlled by that actuator 136. Retraction of each gate actuator 136 pulls the respective gate panel 76 toward the midplane $P_M$ of the chute in order to close the gate. Extension of each gate actuator 136 instead pushes the respective gate panel 76 away from the midplane $P_M$ of the chute in order to open the gate. The drawings show the gate in a fully closed state achieved by full retraction of the two gate actuators 136. On each of the front and rear sides of the guide track 100, the U-shaped track cover 104 can be welded to the respective front and rear L-shaped bars 102A, 102b along the seam where the wider portion 108B of each L-shaped bar 102A, 102B meets with a respective one of the intact outer regions of the corresponding flange 114 of the U-shaped track cover 104. The enclosed guide track 100 and cooperating hanger brackets 122 of the gate panel roller carriages 118 can thus be fabricated from durable structural steel components (L-shaped angles, and U-channel or C-channel) of notable gauge, thus forming a durable structure capable of bearing significant impact loads with out bending, breakage or other failure.

FIG. 10 illustrates a variant of the head gate 26, one in which particular improvements have been made to the neck extender 27' that is mounted on the head gate's two gate panels 76. Description is made as follows only of the added or modified features of the modified neck extender 27' that differentiate it from the earlier version described above, without substantial duplication or repetition of the parts and features that remain unchanged from such earlier description.

Referring initially to FIGS. 10 and 11, each hydraulic actuator 94 of the neck extender 27' has been rotationally re-oriented about its central longitudinal axis so that its two hydraulic ports 140A, 140B now face laterally outward toward the opposing sides of the chute, rather than forwardly outward from the front end of the chute. This way, the hydraulic ports 140A, 140B and the hydraulic hose connections made thereto are situated as far away as possible from the animal when captured between the neck bars 86. This minimizes the chance of potential injury (e.g. skin abrasion or cutting) to the animal, and/or any potential component breakage or leakage, that might otherwise be caused by impactful or moving contact between the animal and hydraulic ports, fittings and hoses.

The design of the hydraulic ports 140A, 140B themselves has also been modified, in that the lower port 140A features a longer neck that projects radially further from the cylinder of the actuator than the upper port 140B. In the illustrated example, where the actuator is oriented rod-end down/closed-end up, the longer-necked lower port 140A is the retraction port of the actuator 94, and the shorter-necked upper port 1406 is the extension port of the actuator 94. As best seen in FIG. 11, the distal end of the neck of each port 140A, 140B, i.e. the end thereof situated furthest from the cylinder of the actuator 94, has a right angle hydraulic fitting 142 attached thereto. Each fitting 142 is positioned in an orientation that reaches upwardly in the neck extender's stowed position, and more particularly reaches upwardly at an upwardly and forwardly oblique angle in the illustrated example. As shown in FIG. 10, a respective hydraulic hose 144A, 144B extends from the fitting 142 of each port 140A, 140B at an initially upward and forward angle, before then curving rearward over the upper cross member 16A of the head gate for connection to a hydraulic pumping circuit. In the illustrated example, the two hydraulic hoses 144A, 144B of each actuator 94 are routed through a shared hose support bracket 146 that is affixed to a respective side of a sign plate 148 of the head gate 26, for example at a respective upper corner thereof. The sign plate 148 is mounted to the upper cross member 16A in a position standing upright therefrom to serve as a signage structure for displaying a manufacturer/product name, logo or other branding associated with the chute.

The shorter neck length of the upper port 140B of each actuator 94 enables clean, untangled routing of the longer-necked lower port's respective hydraulic hose 144A past the distal end of the shorter-necked upper port 140B. As shown, a dual-hose hose guide 150 may bundle the two hoses 144A, 144B together at or near the fitting 142 of the shorter-necked upper port 140B. This tidy routing of the hoses can help reduce twisting of the hoses during movement of the neck extender.

Figure 13:
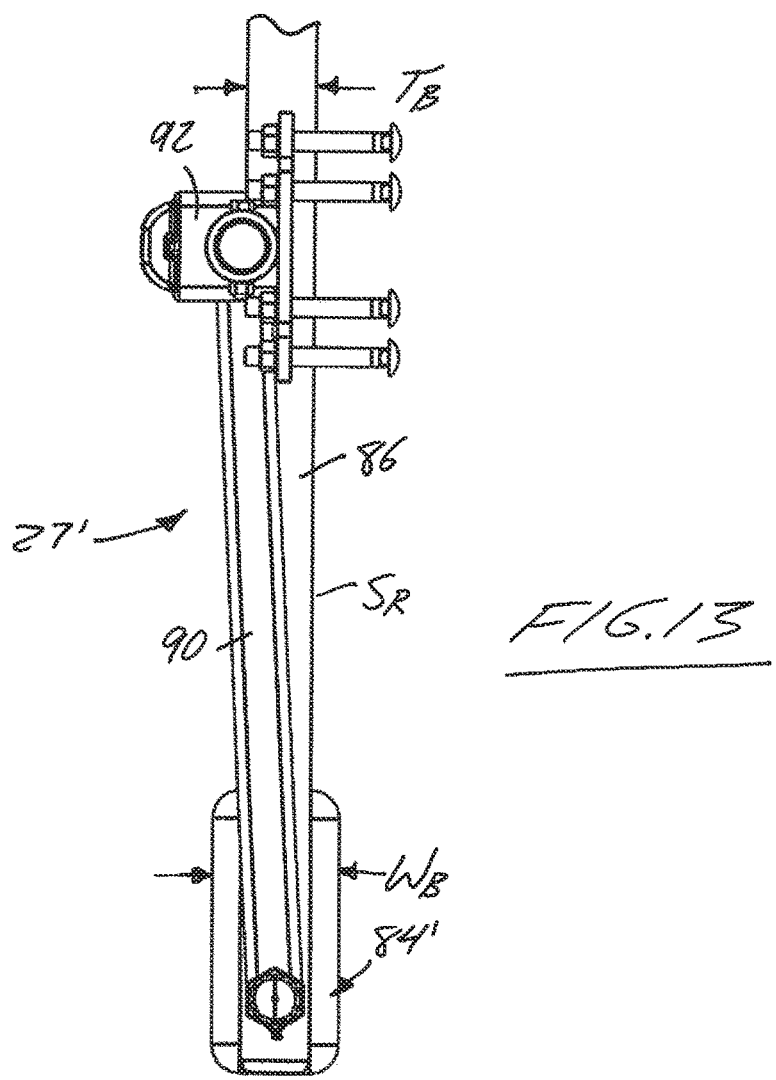
FIG. 13 is a partial side elevational view of the modified neck extender, with closeup emphasis on the novel lower bumpers thereof.

Turning to FIGS. 12 and 13, the modified neck extender 27' also differs in a modified design of the pair of lower bumpers 84' that are mounted to the neck bars 86 at or near the bottom ends thereof. The modified bumpers 84' differ from those shown on the earlier neck extender 27 in that they each have a bumper width WB that exceeds a corresponding bar thickness TB of the neck bar 86, as measured in a front/rear direction in which a front side SF of the neck bar (facing away from the chute) and a rear side SR of the neck bar (facing toward the chute) are separated. Each modified bumper 84' is mounted in a position in which at least part of its greater width protrudes beyond the rear side SR of the respective neck bar 86 on which it is mounted, thus defining a rear padding element on the movable neck bar 86.

This rear padding provides cushioning against any impact of the neck bars 86 against the gate panels 76 when the neck extender 27' is moved from the deployed position back into the stowed position. In the illustrated example, the two modified bumpers 84' are identical, and are mounted to the neck bars 86 in symmetrically mirrored relation to one another. Accordingly, in each bumper's installed position on the respective neck bar 86, its bumper width WB juts not only rearwardly from the rear side SR of the neck bar, but also juts a matching distance forwardly from the front side SF of the neck bar 86. Each of the two identical bumpers 84' is thus mountable to either of the two neck bars 86, simply by reversing the position of the bumper 84.

Figures 14A, 14B:
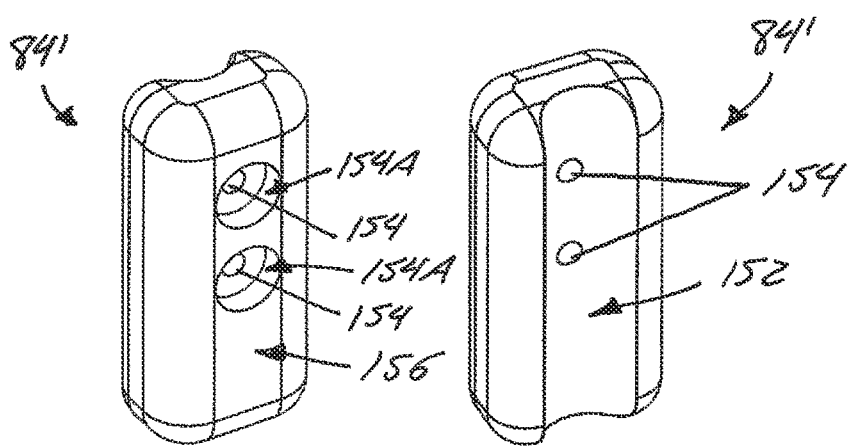
FIGS. 14A and 14B are perspective views of one of said novel lower bumpers of the modified neck extender, from opposing sides thereof.

While the illustrated embodiment particularly uses wide bumpers that both pad the facing-together inner sides of the neck bars, for cushioning effect during closure of the head gate 26, and also jut rearwardly from the rear sides of the neck bars to provide cushioning effect during stowage of the neck extender, it will be appreciated that separate bumpers on the inner sides and rear sides of the neck bars may alternatively be used to similar resulting effect. With reference to the illustrated example in FIG. 14, each bumper 84' has an concavely-recessed outward-facing mounting side 152 for conforming fit against the inner side of the respective neck bar 86, and a pair of fastening bores 154 that penetrate fully through the bumper from this concave outward-facing mounting side 152 to an opposing inward-facing side 156 of the bumper 84'. These fastening bores 154 enable bolted attachment of the bumper to the inner side of the neck bar 86, though other mounting means may alternatively be employed. The fastening bores 154 in the illustrated example have enlarged counterbores 154A at the inward-facing side 156 of the bumper to accommodate heads of the mounting bolts 158 in recessed relation to the bumper surface. Protruding shaft ends of the mounting bolts 158 and corresponding nuts 160 threaded thereon reside at the outer sides of the neck bars 86 that face away from the animal, to avoid presenting any potential injury hazards to the animal among the mounting components of the bumpers.

Since various modifications can be made in my invention as herein above described, and many apparently widely different embodiments of same made, it is intended that all matter contained in the accompanying specification shall be interpreted as illustrative only and not in a limiting sense.

The invention claimed is:

1. A livestock squeeze chute comprising:
a frame having an entrance at one end an exit at an opposing end spaced therefrom in a longitudinal direction;
first and second squeeze panels movably supported on the frame between the entrance and the exit in positions residing opposite one another in a lateral direction that lies transverse to said longitudinal direction;
said first and second squeeze panels being reconfigurable between at least:
a parallel-squeeze configuration in which said first and second squeeze panels reside substantially parallel to one another in substantially vertical planes running in the longitudinal direction, thereby delimiting a rectangular squeeze space between said first and second squeeze panels that, throughout a height of said rectangular squeeze space, has a substantially uniform width measured between said first and second squeeze panels in said transverse direction; and
a V-squeeze configuration in which said first and second squeeze panels reside in non-parallel upwardly divergent relation to one another in respective inclined planes of laterally tilted relation to said vertical planes, thereby delimiting a downwardly tapered squeeze space between said first and second squeeze panels that has a downwardly tapered width measured between said first and second squeeze panels said transverse direction;
wherein said first and second squeeze panels are configured for selective movement relative to one another, in each of said parallel-squeeze and V-squeeze configurations, both in a squeezing manner moving toward one another in said lateral direction to constrict said rectangular or tapered squeeze space, and in a retracting manner moving away from one another in said lateral direction to widen said rectangular or tapered squeeze space.

2. The livestock squeeze chute of claim 1 wherein each of said first and second squeeze panels is supported from above in pivotably suspended fashion from a respective set of upper supports that both define a respective upper pivot axis that runs in the longitudinal direction and about which the respective squeeze panel is pivotable, and are also displaceable back and forth in the lateral direction to change a position of said respective upper pivot axis.

3. The livestock squeeze chute of claim 2 wherein the upper supports for said first and second squeeze panels are supported by, and movable back and forth along, a set of laterally oriented overhead support tracks.

4. The livestock of squeeze chute of claim 3 wherein each upper support comprises a slider or roller engaged with one of the overhead support tracks for movement back and forth therealong.

5. The livestock of squeeze chute of claim 4 wherein each upper support further comprises and pin or axle lying on the upper pivot axis and about which the squeeze panel is pivotable relative to the slider or roller.

6. The livestock squeeze chute of claim 1 wherein each of the squeeze panels is supported in suspended fashion by a respective set of angled hangers that angle upwardly from the squeeze panel in divergent relation from the plane of the squeeze panel toward a midplane of the frame.

7. The livestock squeeze chute of claim 2 comprising, for each squeeze panel, at least one lower actuator connected between the frame and said squeeze panel and operable to perform pivoting thereof about said respective upper pivot axis.

8. The livestock squeeze chute of claim 2 comprising, for each squeeze panel, at least one respective upper actuator configured to perform displacement of said respective set of upper supports back and forth in the lateral direction.

9. The livestock squeeze chute of claim 8 wherein each of the squeeze panels comprises an angled actuator bracket that angles upwardly from the squeeze panel in divergent relation from the plane of the squeeze panel toward a midplane of the frame, and that is coupled to one end of said respective upper actuator.

10. The livestock squeeze chute of claim 1 wherein said first and second squeeze panels, in addition to said parallel-squeeze configuration and said V-squeeze configuration, are reconfigurable into an inverted-V squeeze configuration in which said first and second squeeze panels reside in non-parallel upwardly convergent relation to one another in respective inclined planes of laterally tilted relation to said vertical planes, thereby delimiting an upwardly tapered squeeze space between said first and second squeeze panels that has an upwardly tapered width measured between said first and second squeeze panels said transverse direction.

11. A livestock gate comprising:
first and second gate panels equipped with respective first and second roller carriages at upper ends thereof; and
an overhead guide track traversing across an animal-accommodating opening of the gate and with which the respective first and second roller carriages are rollingly engaged for rolling movement of said first and second gate panels toward one another into a closed position bracing a livestock animal between said first and second gate panels and away from one another into an open position releasing said livestock animal from between said first and second gate panels;
said overhead guide track comprising first and second channels residing, respectively, on opposing front and rear sides of an upright divider wall that separates said channels from one another, said channels having respective floors, of which a first channel floor possessed by said first channel juts forwardly from the upright divider wall and defines a first rail surface in front of the upright divider wall, and a second channel floor possessed by said second channel juts rearwardly from the upright divider wall and defines a second rail surface behind the upright divider wall;

wherein the respective first and second roller carriages of the first and second gate panels each comprise rollers, of which the rollers of the first roller carriage ride atop the first rail surface on the first channel floor in front of the upright divider wall of the track, and the rollers of the second roller carriage ride atop the second rail surface on the second channel floor behind the upright divider wall of the track.

12. The livestock gate of claim 11 wherein the first and second roller carriages respectively comprise first and second hanger brackets attached to and reaching upward from top ends of the first and second gate panels, respectively, of which the first hanger bracket of the first roller carriage resides across the first rail surface from the upright divider wall, and the second hanger bracket of the second roller carriage resides across the second rail surface from the upright divider wall.

13. The livestock gate of claim 12 wherein at least a portion of each hanger bracket is of L-shaped cross section, an upper leg of which is oriented upright and reaches upwardly past the respective rail surface of the respective channel in opposing and facing relation to the upright divider wall, and a lower leg of which is attached to the top end of the respective gate panel and juts from a lower end of the upper leg and spans beneath the respective rail surface of the respective channel.

14. The livestock gate of claim 12 wherein each of the channels has a cut-out at an outer side thereof that opposes the upright divider wall, and each of the roller carriages further comprises a respective actuator bracket that is attached to the hanger bracket and protrudes therefrom through said cut-out to make connection with a respective actuator that is situated outside the respective channel and is operable to displace the respective gate panel back and forth to open and close the gate.

15. A livestock chute comprising a frame having an entrance at one end an exit at an opposing end spaced therefrom in a longitudinal direction, and the gate of claim 11 installed at either said entrance or said exit with the overhead guide track lying in transverse relation to the longitudinal direction.

16. The livestock gate of claim 11 wherein each channel is covered and comprises a hanging flange that resides at an outer side the channel and in opposing relation to the upright divider wall at a position situated across the respective rail surface therefrom.

* * * * *